(12) United States Patent
Tippett et al.

(10) Patent No.: US 7,979,993 B2
(45) Date of Patent: Jul. 19, 2011

(54) APPARATUS, METHOD, AND SYSTEM OF PRECISE IDENTIFICATION OF MULTIPLE POINTS DISTRIBUTED THROUGHOUT AN AREA

(75) Inventors: Nicholas A. Tippett, Oskaloosa, IA (US); David L. Barker, Ottumwa, IA (US); Steven T. Heaton, Oskaloosa, IA (US)

(73) Assignee: Musco Corporation, Oskaloosa, IA (US)

( * ) Notice: Subject to any disclaimer, the term of this patent is extended or adjusted under 35 U.S.C. 154(b) by 0 days.

(21) Appl. No.: 12/834,285

(22) Filed: Jul. 12, 2010

(65) Prior Publication Data

US 2010/0275454 A1    Nov. 4, 2010

Related U.S. Application Data

(62) Division of application No. 11/850,540, filed on Sep. 5, 2007.

(51) Int. Cl.
*G01C 15/00* (2006.01)
(52) U.S. Cl. .................................. 33/228; 33/DIG. 21
(58) Field of Classification Search ............ 33/286, 33/DIG. 21
See application file for complete search history.

(56) References Cited

U.S. PATENT DOCUMENTS

| | | | |
|---|---|---|---|
| 4,450,507 A | 5/1984 | Gordin | |
| 4,836,669 A | 6/1989 | Teach | |
| 6,016,389 A | 1/2000 | Crookham et al. | |
| 6,141,880 A * | 11/2000 | Vircks | 33/1 G |
| 6,453,568 B1 | 9/2002 | Hymer | |
| 7,003,890 B2 | 2/2006 | Kavounas | |
| 7,137,207 B2 * | 11/2006 | Armstrong et al. | 33/286 |
| 7,174,647 B2 | 2/2007 | Krantz et al. | |
| 7,216,437 B2 | 5/2007 | Gordin et al. | |
| 7,363,716 B1 | 4/2008 | Tonkinson et al. | |

(Continued)

OTHER PUBLICATIONS

"FM 2-6X28MM Black Tactical Mil-Dot", download of pages from http://consumer.gzanders.com/itemdetail.php?itemnumber=FM2628T (1 page).

(Continued)

*Primary Examiner* — Yaritza Guadalupe-McCall
(74) *Attorney, Agent, or Firm* — McKee, Voorhees & Sease, P.L.C.

(57) ABSTRACT

A method of laying out a grid of points across an area comprises designating a starting reference point; projecting with the laser beam a first reference line intersecting the first reference point and extending in a first direction relative to the area; designating the set of first line reference points along the first reference line; projecting with a laser beam a second reference line from each of the set of first reference line points in a direction at least partially across the area; designating a set of second line reference points at or near the area along each of the second reference lines, so that a grid of points across the area correlated to at least one laser beam projection is created. In this manner, the laser provides a quick and accurate straight line for referencing points in the grid. The method could be used to just lay out a grid of lines. An apparatus according to one aspect of the invention comprises a portable base, a laser on the base adapted to project a laser beam in a plane, and a means to identify measured points from the base. The measured points can be relative to the projected plane from the laser. The portable base can be moved to different reference points relative to the area to quickly set up a grid of accurate lines or points in the area.

28 Claims, 14 Drawing Sheets

U.S. PATENT DOCUMENTS

| | | | |
|---|---|---|---|
| 7,487,595 | B2 | 2/2009 | Armstrong et al. |
| 7,520,062 | B2 | 4/2009 | Munroe et al. |
| 2005/0274029 | A1 | 12/2005 | Kavounas |
| 2006/0196059 | A1* | 9/2006 | Berto .............................. 33/286 |
| 2006/0198145 | A1 | 9/2006 | Gordin |
| 2006/0245189 | A1 | 11/2006 | Gordin |
| 2007/0062053 | A1 | 3/2007 | Walser et al. |
| 2009/0307913 | A1 | 12/2009 | Schulze |

OTHER PUBLICATIONS

LDBXQ038B, Yeuqing Dengke Electron Ltd., download of pages from http://www.tuvdotcom.com/pi/web/DetailTestedProductCompanyByManufacturer.xml:jse...(2 pages).

"Design Guidelines for Ball Plungers", S&W Manufacturing Company, Inc., parts catalog, download of page from http://www.swmanufacturing.com/ball_plunger_guidelines.asp (1 page).

"Apache Model 54—Thunder Economy Interior Laser Detector—Yellow", Tools & Hardware, Rotary Lasers: Porter Cable RoboToolz RT36202K, Checkpoint Professiona, review Top . . . , download of pages from http://toolsmet.com/rotary-lasers/43.html (4 pages).

Apache Operators Manual for THUNDER® Laser Detector (8 sheets).

Edmund Optics America, "Fundamentals of Lasers" by Alex Pete and Sam Sadoulet, download of pages from http://www.edmundoptics.com/techSupport/DisplayArticle.cfm?articleid=242 (4 pages).

"What does Class 1, 1M, 2, 2M, 3R, 3B and 4 mean?", download of page from http://www.hpa.org.uk/radiation/faq/laser/laser9.htm (1 page).

RP Photonics Consulting GMBH, "Encyclopedia of Laser Physics and Technology, Beam Divergence" download of pages from http://www.rp-photonics.com/beam_divergence.html (2 pages).

U.S. Laser Corporation, Tech. Note, "Measuring Laser Beam Divergence", download of pages from http://www.uslasercorp.com/envoy/diverge.html (3 pages).

Photonic Products, "MLG standard line generators" datasheet (3 pages).

DKG Trading, Inc., "Compact Rifle Scopes" download of pages from http://www.dkgtrading.com/famousmaker/fmcompact.html Aug. 30, 2007 (12 pages).

Denlaser, "Product Detail Information", download pages from http://www.denlaser.com/eshowprod.asp, Aug. 31, 2007 (12 pages).

* cited by examiner

APPARATUS, METHOD, AND SYSTEM OF PRECISE IDENTIFICATION OF MULTIPLE POINTS DISTRIBUTED THROUGHOUT AN AREA

I. CROSS-REFERENCE TO RELATED APPLICATIONS

This is a divisional application of U.S. application Ser. No. 11/850,540 filed Sep. 5, 2007 which is hereby incorporated by reference in its entirety.

II. BACKGROUND OF THE INVENTION

A. Field of the Invention

The present invention relates to an apparatus and method for determining or laying out a grid of spatially separated lines or points across a relatively large area, and in particular, to an apparatus and method which, with sufficient accuracy, is cost-effective and efficient for such purpose in terms of labor, time, and resources.

B. Problems in the Art

A variety of situations call for determining a grid of spatially separated lines or points across an area. One example is a grid of stakes in the ground for grading or surveying an area of ground. Another example is determining a grid of test locations across an area to be illuminated. The test locations are used to take light intensity and uniformity readings. Two examples are sports lighting and parking light lighting. Specifications or regulations set intensity and uniformity requirements for the area. There is a need to check if a lighting design actually meets those requirements. A conventional method is to take discrete measurements at uniformly spaced apart test points throughout the area.

A number of other applications for determining a grid of points throughout an area exist. However, the ability to cost-effectively and efficiently determine the grid and mark the points of such a grid, with a sufficient relatively high accuracy, is neither trivial nor easy to accomplish, especially for relatively large areas such as construction sites, sports fields, and parking lots.

A long-used, and still used, economical technique used for laying out test grids to check illumination levels across an area is tape measures. Open reel tape measures available from a variety of manufacturers can extend substantial distances (for example, several hundreds of feet). The equipment is portable and inexpensive. However, it is difficult to obtain high accuracy. Laying a long flexible tape along the ground may not result in a straight line, even when the tape is pulled taut. Wind, other forces or disturbances, undulations, or objects can affect accuracy. It is difficult for the human eye to verify a straight line. One attempted solution for large areas is to use three to four long tapes and geometric principles to check if a tape is in a straight line along the ground. As can be appreciated, however, this takes well-trained and experienced workers (normally more than two) and is relatively slow. It still is difficult to maintain high accuracy, especially outside in a windy environment. Checking and re-checking by repeated measurements with multiple long tapes is tedious and also subject to human error. As can be further appreciated, analogous issues exist with any application that desires a grid of accurately spaced apart locations to be identified across a relatively wide area.

But accuracy is critical in many of these applications. Consider, for example, laying out a grading pattern for a construction site. A grid of stakes is laid out correlated to a precise grading plan to contour to top of the ground for controlling water runoff. If the grid locations are not accurate, the grading plan can be erroneously applied to the ground and result in water runoff problems that cannot be reversible after construction on the site. Similarly, a grid of surveying stakes must accurately be laid out on a construction site. A building plan is correlated to the surveying points in the grid. If the grid points are inaccurate, architectural plans to the area may be inaccurately designed or applied. This could be expensive to correct or change.

Consider the case of sports lighting. Standards of uniformity and intensity across the field are normally imposed. See, e.g., the IESNA Lighting Manual (2000 $9^{th}$ Edition) for information on uniformity and intensity standards for various sports and fields. The lighting designer, many times with the help of a computer program, selects the number and type of lights to meet the standards that are applicable for a field. The lighting company or installer many times has to demonstrate those standards have been met. A grid of test locations is set out in the field and light uniformity and intensity measurements obtained for those test locations. If the grid of test points is inaccurately laid out, it may not validate that the company or installer has met the requirements and could subject it to expensive penalties or additional work. Conversely, results taken at erroneous test points may falsely indicate a problem with the design or installation, causing the company or installer to needlessly, expensively, and erroneously re-aim the fixtures.

Use of measuring tapes uses cheap and easily portable tools, but the risk of error in laying out such grids leaves much room for improvement. Land survey equipment could be used, but it is expensive and requires highly trained and qualified technicians to operate. For example, laser transits are very accurate, but costly and usually require more than one trained operator. They are also relatively slow to use. They must also be calibrated and handled carefully.

GPS and other similar geographic location technology has evolved quickly in the past decades. The cost of hand-held units is not cheap, but has come down in recent years. However, they remain relatively expensive to obtain high accuracy. Also, to determine and mark a number of discrete test points across a relatively large area, such methods are relatively slow.

It can therefore be seen that there is room for improvement in the art for tools and methods of laying out grids of points across a relatively large area that is relatively easy to implement, inexpensive, and quick but achieves relatively high accuracy for a variety of situations, including out-of-doors.

III. BRIEF SUMMARY OF THE INVENTION

It is therefore a principal object, feature, aspect or advantage of the present invention to provide an apparatus and method which improves over or solves problems and deficiencies in the state of the art. Further objects, features, aspects, or advantages of the invention involve a method or apparatus which includes one or more of:

a) can achieve sufficient accuracy or improve accuracy of grid layout;

b) can improve speed of grid layout;

c) can reduce resources needed for grid layout, including labor and time;

d) is applicable to a variety of applications;

e) is adaptable to different sized and shaped areas;

f) is adjustable as to spacing of the points in the grid pattern;

g) is portable;

h) is efficient and economical.

According to one aspect of the invention, a method of laying out a grid of points across an area comprises designating a first reference point; projecting with a laser beam a first reference line intersecting the first reference point and extending in a direction relative to a first dimension of the area; designating a set of first line reference points along the first reference line using an open reel tape or other measuring device or means; projecting with a laser beam a transverse reference lines from each of the set of first reference line points in a direction relative to a second dimension of and at least partially across the area; designating a set of transverse line reference points along each of the transverse reference lines using an open reel tape or other measuring device or means. A grid of points across the area is thus correlated to at least one laser beam projection. In this manner, the laser provides a quick and accurate straight line for referencing and setting all points in the grid. The laser also can provide a way to periodically re-check alignment while laying out the grid.

An apparatus according to one aspect of the invention comprises a portable base, a relatively small, inexpensive laser in the base adapted to project a laser beam in a line or plane, and a means to identify measured points from the base. The measured points can be relative to a projected straight line from the laser. The portable base can be moved to different reference points relative to the area to quickly set up a grid of accurate points across or in the area that is referenced from a laser-projected straight line. The means to identify measured points can be, for example, a measuring tape.

In another aspect of the invention, an apparatus includes a portable base, a first laser adapted to project a laser beam in a line in a first direction relative the base, a second laser adapted to project the laser beam in a line in a second direction of predetermined offset from the first direction, and an optical sight comprising an aiming axis correlated to the laser beam of the first laser. The known offset of the two lasers and the ability to optically sight relative one laser allows quick and efficient setup of a grid of points across an area.

These and other objects, features, advantages, and/or aspects of the invention will become more apparent with reference to the accompanying specification and claims.

IV. BRIEF DESCRIPTION OF THE DRAWINGS

V. DETAILED DESCRIPTION OF EXEMPLARY EMBODIMENTS

A. Overview

Figure 1:
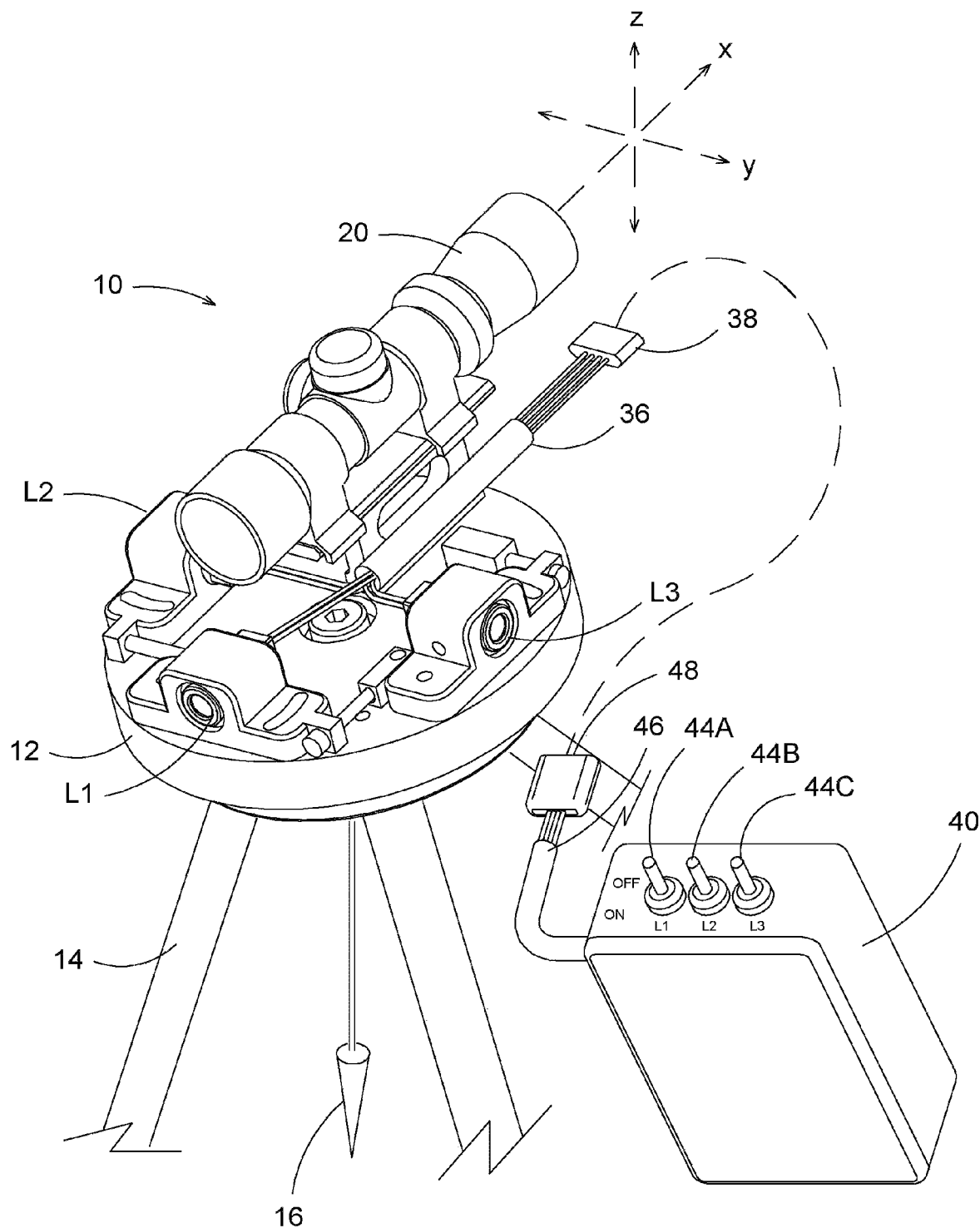
FIG. 1 is a perspective view of a tool for laying out grid patterns over a relatively large area and electrical control unit according to one aspect of the present invention.

For a better understanding of the invention, several examples of forms or aspects the invention can take will now be described in detail. It is to be understood that these are non-limiting examples of just a few of the forms and aspects the invention can take and are not inclusive or exclusive.

Frequent reference will be taken to the drawings. Reference numbers or letters will be used to indicate certain parts and locations in the drawings. The same reference numbers or letters will be used to indicate the same parts or locations throughout the drawings unless otherwise indicated.

These exemplary embodiments will be discussed in the context of laying out a grid of equally spaced apart test points across a sports field for the purposes of measuring intensity and uniformity at each point relative to specified minimum intensity and uniformity illumination requirements for a lighting system which is pre-designed for that field. However, as will be appreciated, these examples illustrate the plotting or laying out of spatially distributed physical lines or points across an area regardless of the nature of the area or the purpose of laying out the grid of lines or points.

B. Apparatus

FIGS. 1-6 illustrate a tool 10 according to an exemplary embodiment of an aspect of the present invention. Tool 10 can be applied to examples of grid-plotting methods that will be set forth later in this description.

1. Turntable/Tripod

Figure 6:
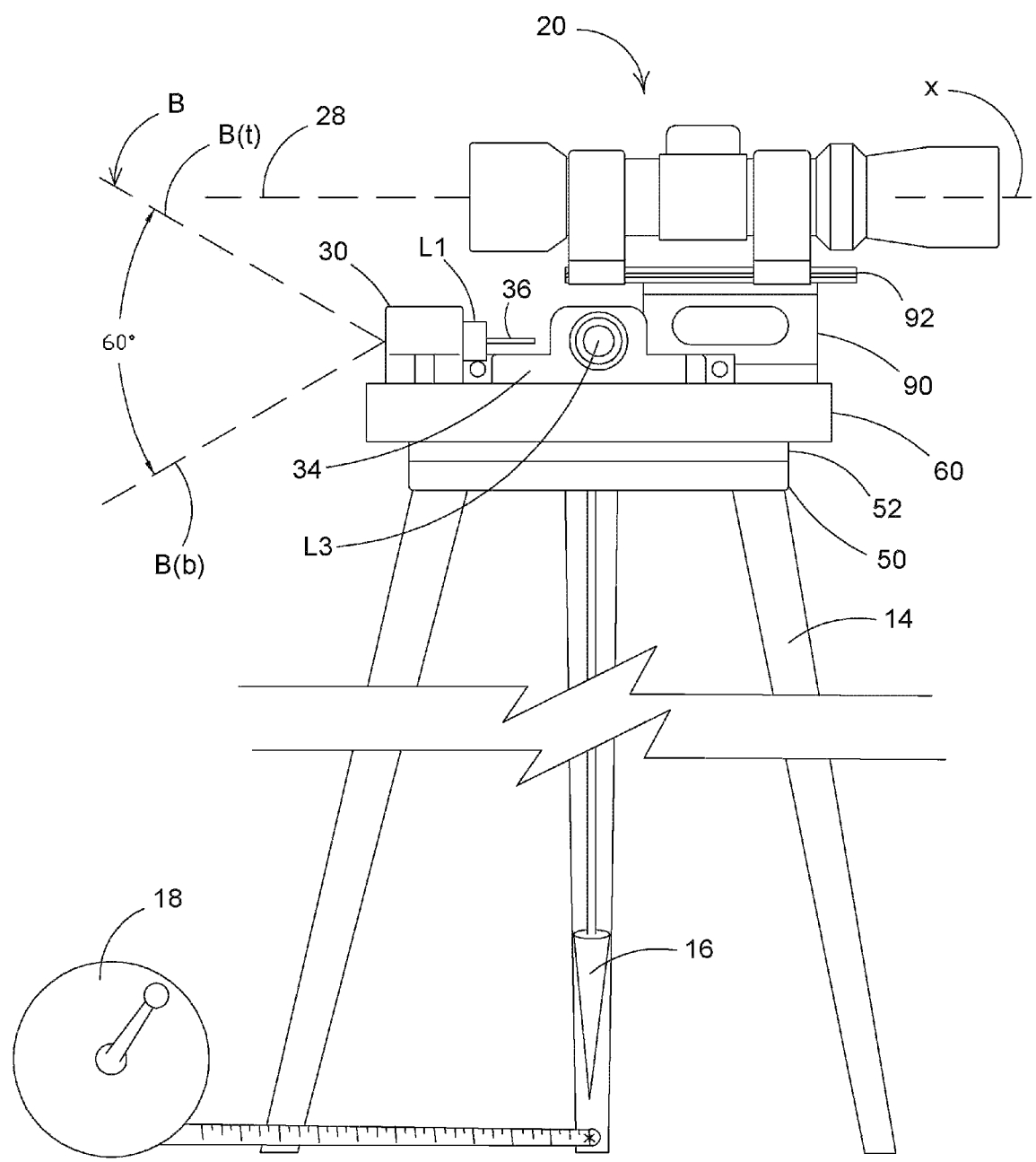
FIG. 6 is a side elevation of the tool of FIG. 1, also illustrating a measuring means, here a tape measure, which can be used in conjunction with the tool of FIG. 1.

A rotatable turntable 12 is mounted to the top of a tripod 14 or other device to position, support, and stabilize. As illustrated in FIG. 6, a plumb bob 16 hangs down by a string from the center of turntable 12 or center of tripod 14 (with the center of turntable 12 being mounted over the center of tripod 12) towards the ground or floor upon which the bottom ends of the longitudinally adjustable tripod 14 legs would rest. There can be a bubble level or other means to indicate the top of the turntable is level or horizontal. By this combination, using known methods, turntable 12 can be quite accurately set in a horizontal plane. The plumb bob would also basically indicate the center of turntable 12, or tool 10, relative to the ground or floor. The plumb bob provides a reference to the vertical direction relative to the earth.

Many or most tripods have some mechanism in its head that allows it to rotate in at least two directions. For example, the Manfrotto™ brand Model 410 head from Gruppo Manfrotto Srl, Via Sasso Rosso, 19, 36061 Bassano del Grappa (VI), ITALY, allows for movement. Because it has a geared movement, it allows for fine-tune adjustment. The movement is independent of the indexed movement described below. A geared rotatable head could be included with the tripod.

Another example is a Checkpoint™ brand Model R2-D2 Rotary Base commercially available from a variety of vendors, including at ContractorsTools.com.

2. Tape Measure

A means to measure distance, and specifically incremental distances, is used with tool 10. As indicated in FIG. 6, in this embodiment the distance measuring means is a tape measure. Tape measure 18 is utilized to measure from tool 10 outward along the ground or floor. It measures from the center of tool 10, here the point of intersection of the vertical line indicated by plumb bob 16 with the ground or floor. In this example, tape measure 18 can be a commercially available 300 ft tape measure with indicia indicating each foot along the 300 ft. One example is a Lufkin Pro FBGL open-reel 300 foot tape rule available from a plurality of sources. Other styles and lengths are, of course, possible.

3. Optical Sight

An optical sight 20, for example a sighting scope such as would be used on a rifle, is mounted on top of turntable 12. Sight 20 includes a mounting structure 22 which allows it to be removably fixed to turntable mounting structures 90 and 92 (see FIG. 2).

Sight 20 can be any of a variety of commercially available products. One example is a Famous Maker™ brand Model FM 2628 (2-6×28 mm, duplex reticle, compact rifle scope) commercially available from FM Optics & Accessories and DKG Trading, Evansville, Ill. USA and Zander Sporting Goods, Baldwin, Ill. USA.

Scope or sight 20 has some type of visually perceivable aiming indicia. An example of such indicia is cross-hairs, the intersection of which indicates a longitudinal aiming axis through scope 20. Scope 20 is mounted to turntable 12 so that the cross-hairs are aligned in horizontal and vertical planes respectively. The intersection of the cross-hairs indicates longitudinal aiming axis 28 through scope sight 20.

Sight 20 is conventional and can be selectable according to the amount of magnification, accuracy, cost, durability, and adjustment desired. For example, sight 20 can include adjustment knobs 94 and 96 to precisely adjust its horizontal and vertical aiming axes relative its mount to turntable 12.

As can be appreciated, the user can look through eye piece 24 to view the cross-hairs. The optics of sight 20 would magnify the image coming through the opposite end 26 that is within the field of view of the user. The intersection of the cross-hairs would indicate a line that is parallel with the top plane of turntable 12 and, thus, horizontal.

4. Laser(s)

Laser devices L1, L2 and L3 are mounted at orthogonal positions on the top surface of turntable 12 (see FIG. 1). Lasers L1, L2 and L3 are relatively small, low-power, and inexpensive commercially available devices in the nature of laser pointers or line lasers (e.g., similar to those used in laser levels). They are specifically configured to have an optical lens at their output which diverges, fans, or spreads the laser beam issuing from it in a plane. An example would be a Model PLKD LDBXQ03B industrial grade line laser module with 60° fan angle in one plane from Yueqing Dengke Electron Ltd., Xiaxue Industry Area, Shifan Town, Yueqing, Zhejiang CHINA (and purchasable from http:\\denlaser.com) (635 or 650 nm wavelength).

Figure 4:
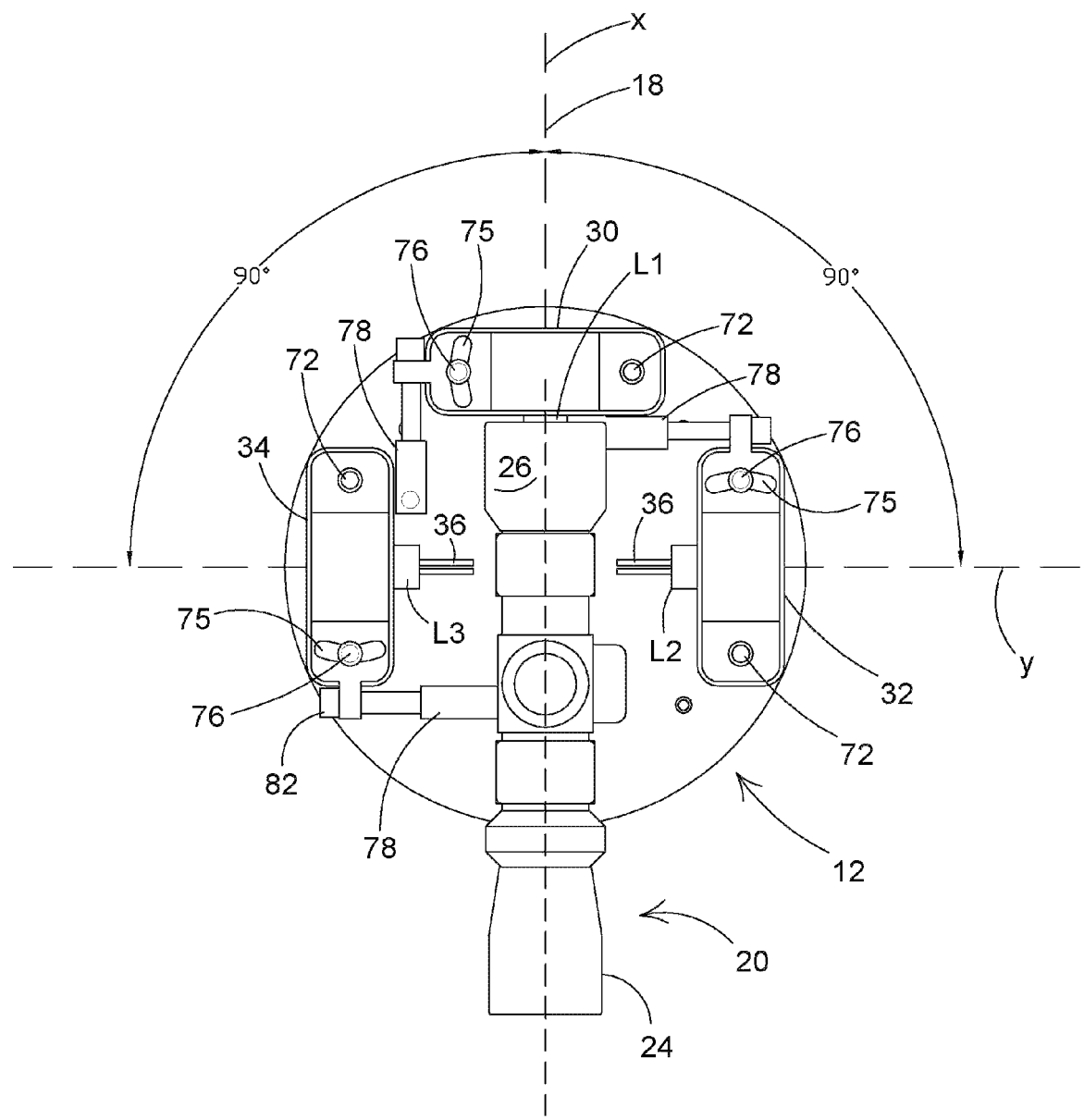
FIG. 4 is a top plan view of the tool of FIG. 1 including reference lines indicating pre-set orientation of components of the tool relative to one another.

As indicated in the Figures, each laser L1, L2, and L3 is mounted to the top of turntable 12 in a housing 30, 32, or 34, respectively, at the positions indicated in FIGS. 1 and 4. Each laser L is slid into a complementary receiver (e.g. throughhole) in its respective housing 30, 32, or 34. The laser L is rotated and tested so that, when in operation, the plane of its 60° fan angle for beam B is vertical. Set screw 71 is then tightened to hold it in that position.

As indicated in FIG. 6, in this example beam B is essentially a line in one plane (the horizontal plane when operated) and diverging at an angle in an orthogonal plane (the vertical plane when operated). The beam divergence angle or fan is 60 degrees total angle essentially in one plane. Its horizontal divergence or spread is intentionally kept small or none. The horizontal width is similar to a laser dot or line pointer. It is kept relatively narrow, but spread or diverged in the vertical plane to create basically a vertical plane or wall of line issuing along the central axis of the laser. For purposes of illustration only, in FIG. 6 this vertical fanning of the beam is indicated by line B(t), generally indicating the top of beam B, and line B(b), generally indicating the bottom of beam B. Beam B thus diverges approximately +/−30 degrees above and below the center of a horizontal axis through its laser L. It is again emphasized that beam B is spread at the approximately 60 degree angle in the vertical plane, but is intentionally not spread in the horizontal plane. The purpose of this will become more apparent in later discussion of use of tool 10. It is to be understood that a 60° beam fan or divergence is used in this Example. However, it could be of other angles. For example, in some cases it could be on the order of 10°, or even less. It could also be greater than 60°.

Figure 13:
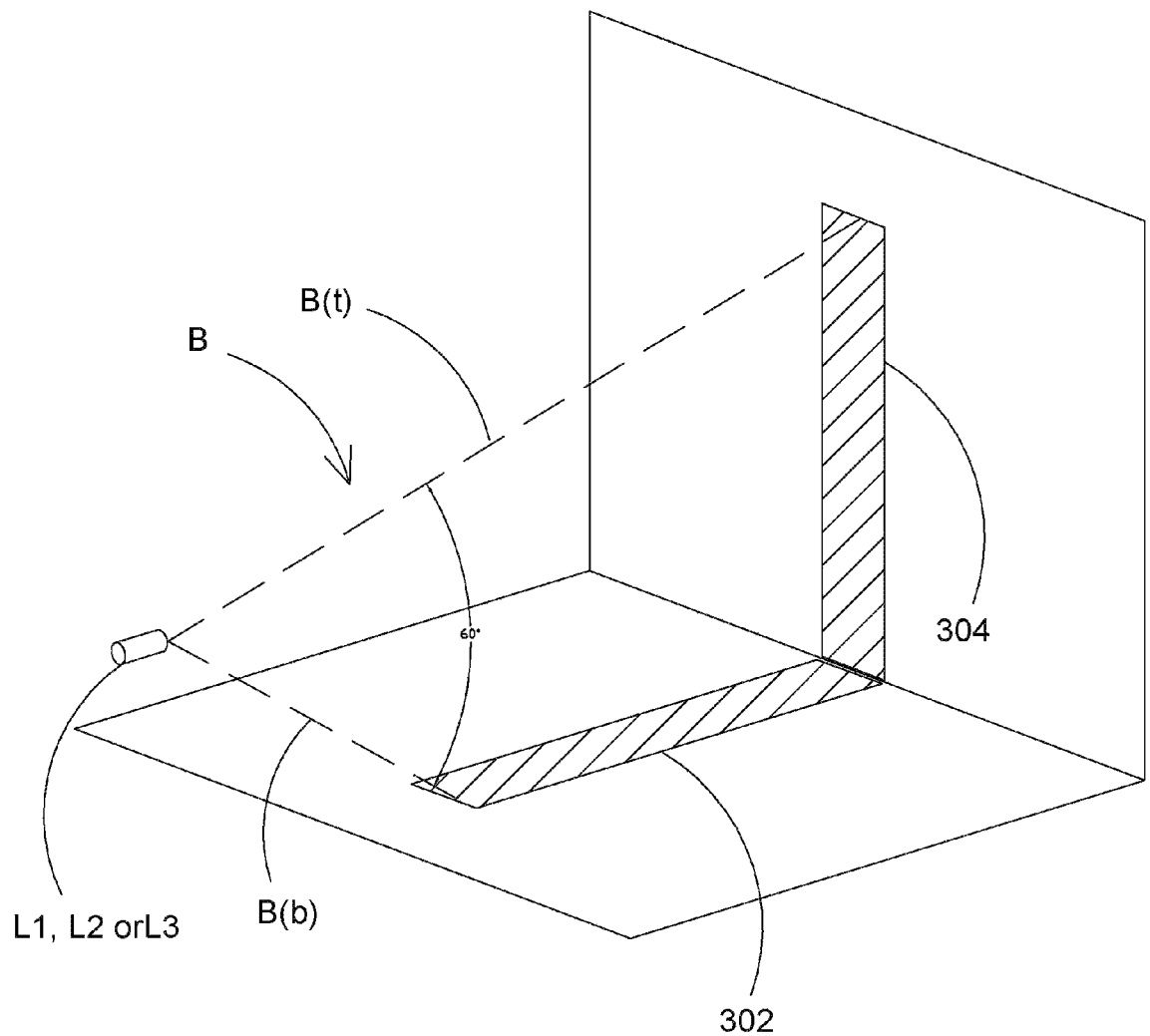
FIG. 13 is a diagrammatic view illustrating the beam shape of lasers used with the tool of FIG. 1.

FIG. 13 illustrates diagrammatically the shape of beam B from any of lasers L1, L2, or L3 if projected onto vertical and horizontal surfaces. The projection of the width of beam B is greatly exaggerated in this illustration. The bottom B(b) of beam B would intersect the ground at some point in front of the laser; which would be determined by the angle of beam spread and the height of the laser from the ground. Thus, from that point of intersection and outwardly, laser would project a straight line 302 along the ground. The projection 304 of beam B onto the vertical wall in FIG. 13 is intended to illustrate how fan beam B, diverging in the vertical plane from the laser, would create essentially a vertical plane of light energy above the projected line along the ground. Thus, a worker simply has to identify that vertical plane of light to identify the straight line along the ground. The worker does this by walking or moving through the vertical plane of light, even though it is usually not visible, and seeing the "flash" or "star flash" of intensity when the human eye is directly in line with the vertical plane of light and viewing the laser source. The worker only has to find the line by finding the plane, instead of the very difficult task of trying to find a line laser that is small and narrow both vertically and horizontally. The intentional divergence of beam B in the vertical plane substantially reduces the "hunting" or searching of a worker to try to find an invisible horizontal line the diameter of a laser pointer dot. Finding a vertical plane of light is much quicker and more efficient.

As indicated diagrammatically at FIG. 4, when calibrated and correctly positioned, laser L1 issues a laser beam in a vertical plane which is coincident with aiming axis 28 of sight 20. Thus, when the user looks through sight 20 and identifies the vertical cross-hair, that vertical cross-hair would likewise be coplanar with the vertical plane of the laser beam from laser L1. Correctly adjusted, laser L2 would issue a 60 degrees vertical spread or fanned beam at a 90° angle to laser L1. Its vertical beam plane would be at a 90° angle to the vertical beam plane of laser L1. Similarly, laser L3 would issue a 60 degrees beam spread or fanned in a vertical plane that is 90° the beam plane of laser L1 and, thus, at 180° to the beam plane of laser L2.

Figure 2:
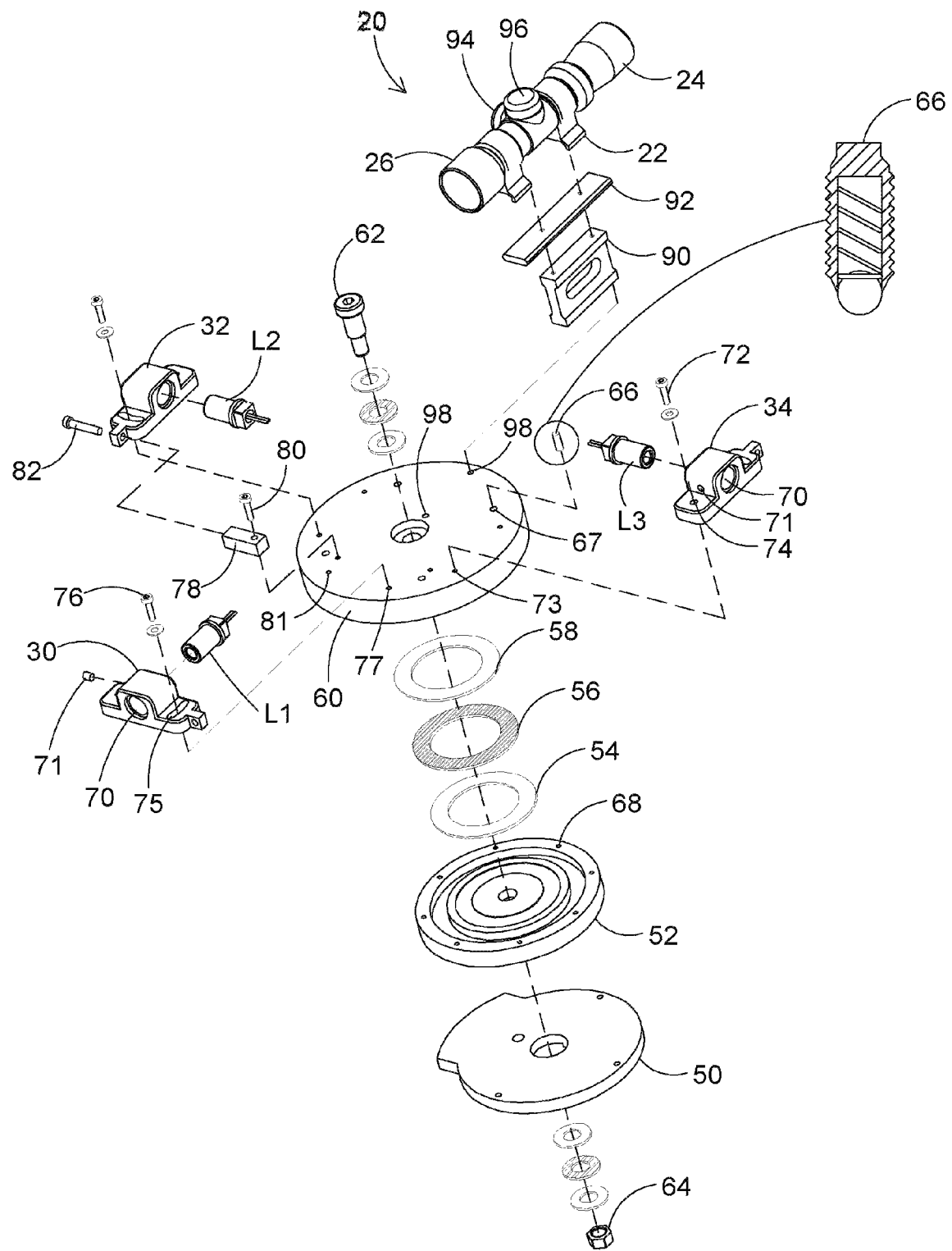
FIG. 2 is an exploded view of the tool of FIG. 1.

By referring to FIGS. 2 and 4, adjustment of lasers L1, L2 and L3 to bring about this precise orthogonal relationship to one another is allowed by pivotally pinning one side of each laser housing 30, 32 and 34 to the top of turntable 12 by Allen screw 72 through hole 74 of the housing 30, 32, or 34 into a threaded aperture 73 tapped into turntable 12. Just one screw 72 relative to housing 34 is shown in FIG. 2 for simplicity. An identical screw 72 would similarly pivotally pin housings 30 and 32 to turntable 12. The opposite side of housing 30, 32 and 34 is held to the top of turntable 12 by Allen screw 76 (one shown in FIG. 2 relative to housing 30 for simplicity) through an arcuate slot 75 and then into a threaded aperture 77 in turntable 12. This allows each housing 30, 32, and 34 to pivot on the surface of turntable 12 around its screw 72 over a range defined by the arcuate slot 75 on top of turntable 12. A calibration block 78 for each housing 30, 32, and 34 is fixed to the top of turntable 12 by Allen screw 80 (one screw 80 only shown in FIG. 2 for simplicity). An Allen screw or bolt 82 (only one shown in FIG. 2 for simplicity) passes through internally threaded through-bore 83 of an ear on housing 30, 32, and 34 and into internally threaded blind bore 84 into one end of block 78. Rotation of adjustment screw 82 clockwise and counter-clockwise causes housing 30, 32, or 34 to pivot on screw 72 towards or away from the center of turntable 12, thus allowing pivoting adjustment of the horizontal aiming direction of each LED L by appropriate rotation of screw 82. Thus, the 90° offset of the beams of lasers L2 and L3 from laser L1, as illustrated in FIG. 4, can be precisely set turning on each laser L1, L2, and L3 and projecting their respective laser beams B and measuring the angles formed between them, or by other methods such as are within the skill of those skilled in the art.

Lasers L1, L2, and L3 are relatively inexpensive (e.g. around $2.30 each) and relatively low power (around 3 mW). Accordingly, they can operate by battery power. Laser L1, L2, and L3 generate Class 2M beams by the relatively large angle of divergence of beam B.

Figure 3:
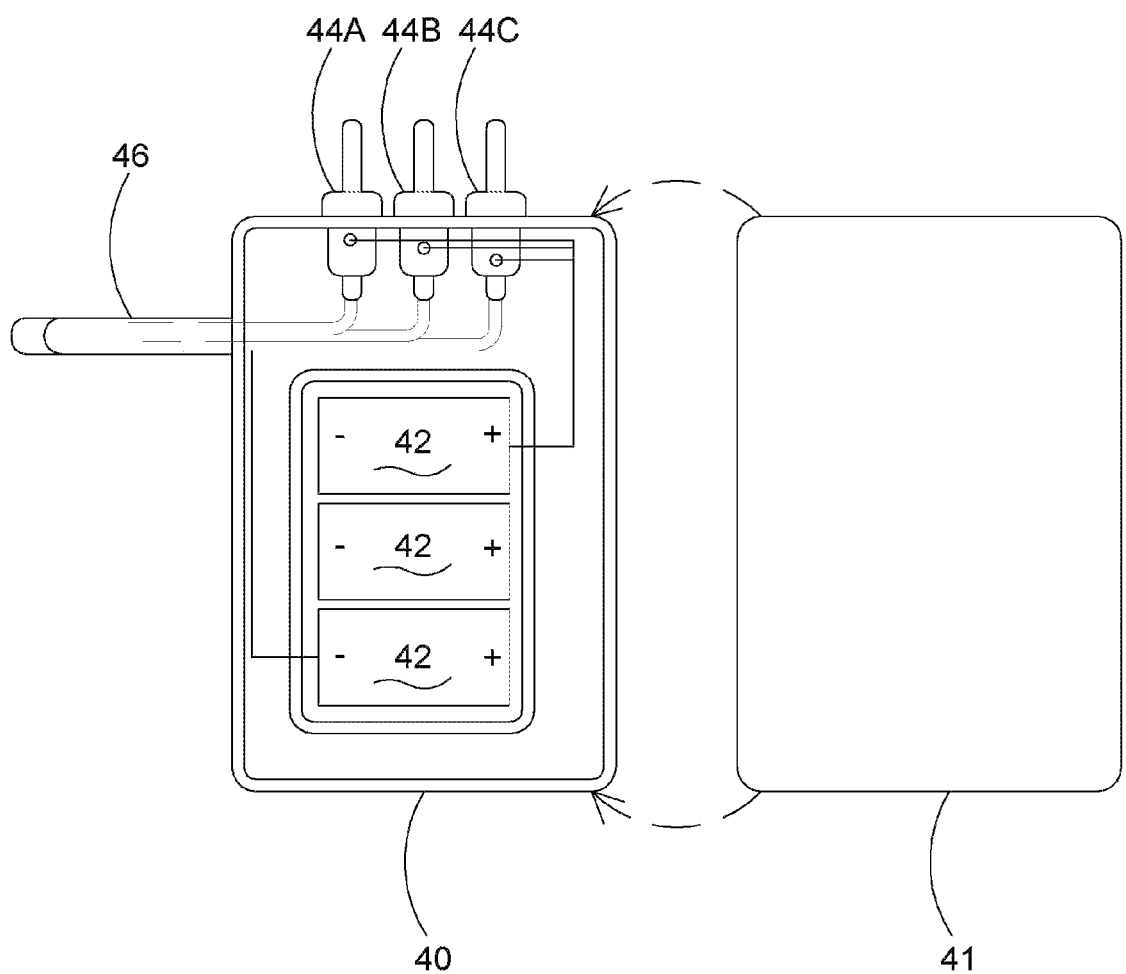
FIG. 3 is an enlarged view of the electrical control unit of FIG. 1 showing its interior contents and a removable lid.

As indicated in FIGS. 1 and 3, tool 10 is truly portable in the sense that an onboard or hand-carried housing 40 is sized to contain (in this example) three "D" size alkaline batteries. Three toggle switches 44A-C are mounted on housing 40. Wiring 46 is operatively connected between batteries 42 and switches 44. A plug 48 is mateable with plug 38 for wiring 36 that extends to each of lasers L1, L2 and L3. Switches 44 are in series with batteries 42. The user can selectively turn on or off each and any of lasers L1, L2, and L3 by operation of a corresponding switch 44. A lid 41 can be removable from housing 40 to replace batteries 42 and access the interior of housing 40, if desired. Seals can be used between lid 41 and its seat in housing 40 to deter water from entering the interior of housing 30, if desired.

5. Indexing Mechanism for Turntable

Additionally, turntable 12 has what will be called an indexing mechanism. The indexing mechanism provides eight positive-stop rotational positions for turntable 12. Each position is 45 degrees in rotation from the next. Turntable basically "clicks" into place at each position by spring-loaded plunger balls seating into corresponding indents.

By referring to FIGS. 2 and 4, components of tool 10 such as scope 20 and lasers L1, L2, and L3 are mounted to the top surface of a rotatable upper turntable plate 60 of turntable 12. A lower turntable plate 52 is fixed to a tripod mounting plate 50 by screws or bolts or other fasteners. Tripod mounting plate is fixed to the tripod legs (e.g. via quick-release cams or other fasteners such as are common with many tripods).

A bearing 56, with washers 54 and 58 on opposite sides, is sandwiched between upper and bottom turntable plates 60 and 52 (see FIG. 2). Shoulder bolt 62, passing through center holes in each of plates 60, 50 and 52, as well as bearing 56, and lock nut 64 compress plates 60 and 52 together, with bearing 56 between. This arrangement allows rotation of top turntable plate 60 relative to bottom turntable plate 52, which is rigidly fixed on tripod mount plate 50. Bearing 58 takes up the friction of rotation between those two plates.

Figure 5:
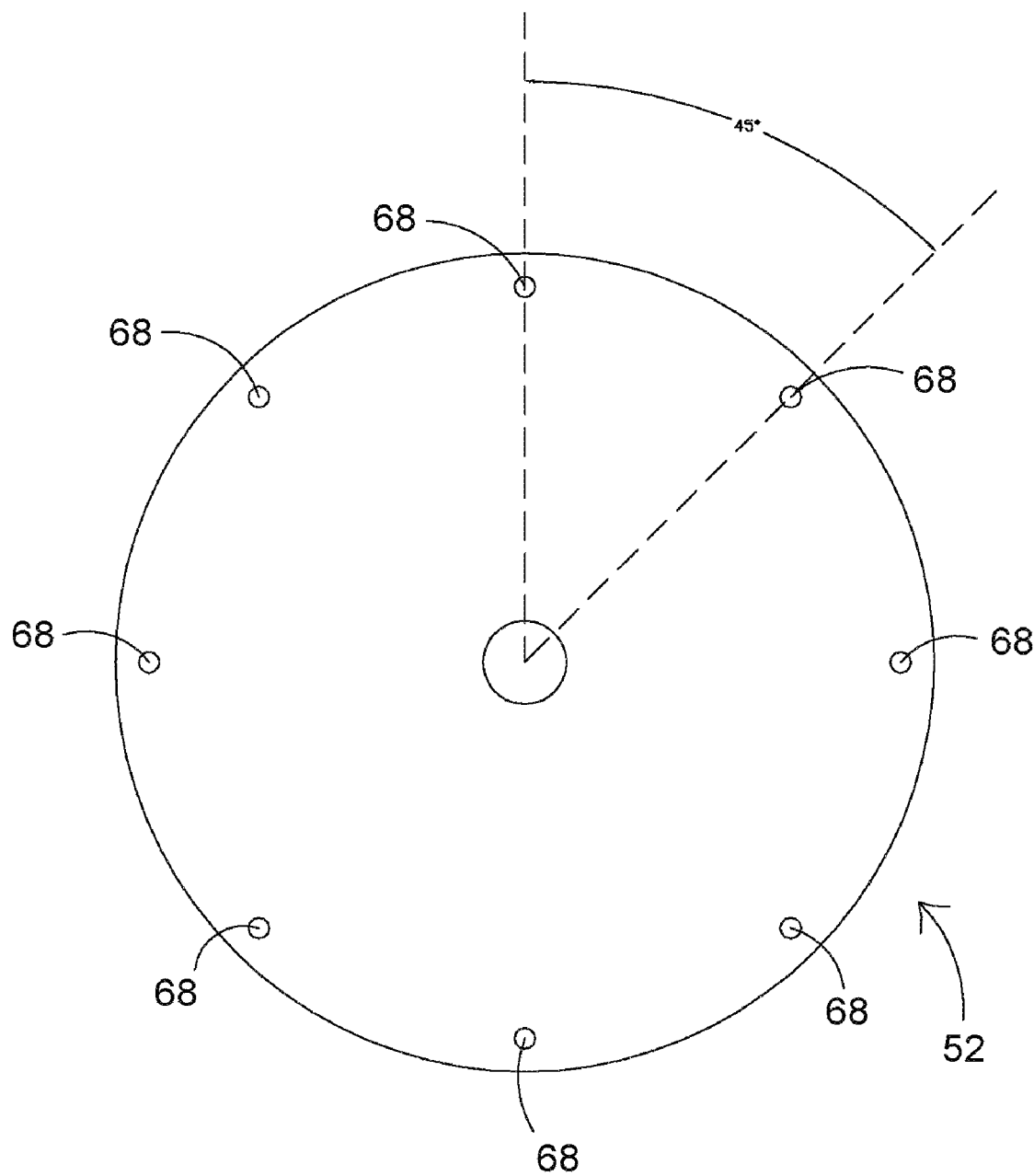
FIG. 5 is a top plan view of an indexing mechanism used with the tool of FIG. 1 to provide indexed rotational positions for a turntable of the tool.

Furthermore, bottom turntable plate 52 has eight detents, notches, or indentions 68 at 45° spaced-apart radial positions from its center (see also FIG. 5). Top turntable plate 60 has four through-bores 67 in which spring-loaded ball plungers 66 (just one shown in FIG. 2 for simplicity) are mixed. Ball plungers 66 are of conventional type and extend down from the bottom surface of top turntable plate 60. Ball bearings at the bottom of ball plungers 66 extend slightly below the plane of the bottom of upper turntable plate 60 and ride in the circle that includes indentions 68 of bottom turntable plate 52.

Just one ball plunger 66 is shown, for simplicity, in FIG. 2. There can be just one, but in this example there are four at 90 degree positions around upper turntable plate 60. An example of a ball plunger is part number SW10-5B, an elongated externally threaded body with an internal spring urging a metal ball bearing out of an opening and downward from its bottom end, commercially available from S & W Manufacturing Company, Inc. of Bensenville, Ill. USA (see enlarged cross section detail in FIG. 2). The ball plunger threads into an internally threaded aperture 67 in plate 60. The ball extends slightly below the plane of the bottom of plate 60 when installed. Another example is a Spring Ball Plunger from Holo Pak Enterprises Ltd., No. 78, Lane 10, Lu-Guang Rd., Ping-Jhen City, Tao-Yuan County, 32451, TAIWAN. It has an elongated body with ball bearing (metal or plastic) at the bottom open end and an internal spring (see also the enlarged cross-section illustration in FIG. 2 of ball plunger 66). The body of the ball plunger is simply interference or press fit into aperture in plate 60.

Thus, when top turntable plate 60 is rotated relative to bottom turntable plate 52 so that the set of four ball bearings of ball plungers 66 line up with four indentions 68, the ball bearings will be forced into the corresponding four indentions 68 and create a positive stop or indexed position. Upper turntable plate will be held in that rotational position. If the user wants a different rotational position, the user simply uses enough manual force to turn upper turntable plate 60 until the downward spring force on the ball bearings is overcome and the ball bearings move out of those indentions. Because each indention is at a precise 45 degree offset relative to adjacent indentions 68, the user has seven other positively indexed rotational positions to choose from. For example, if the user wants a 45 degree reorientation of upper turntable plate 60, the user simply turns plate 60 until the ball bearings of ball plungers 66 "click" into the next corresponding set of detents 68. If the user wants to reposition plate 60 at 90 degrees from a present rotational position, the user simply turns plate 60 until the second "click" stop for ball plungers 66. The user also has the options of 135, 180, 225, 270, 315, and 360 degrees "click stop" or positive indexed stop reorientations. As can be appreciated, this combination allows eight 45° rotational positions. Because of the preset orientation of sight 20 and laser L1 relative to a first indexed position, and the preset orientations of lasers L2 and L3 to laser L1, the user can rotate turntable 12 to any of the different 45° rotational positions desired without having to hunt, seek or measure. Of course, these indexed positions could be placed in any arrangement or angular relationship according to need or desire. For example, some applications might use 30 degree offsets instead of 45 degree. They could vary in number (could be just one, two, three, or more) and do not have to be equally spaced.

FIGS. 1-6 therefore illustrate tool 10 has the following relationships and features. It is portable and can be setup on a variety of surfaces, including grass, dirt, hard floor, gravel, etc. It can elevate the rotatable turntable 12 to adjustable distances by adjustment of the length of the legs of the tripod 14. In one embodiment, tripod 14 is adjustable such that sight 20 would be at or about the average height of a human.

6. Calibration/Operational Set-Up

As can be appreciated from the foregoing description of tool 10 and its components, certain orientations and calibrations can be completed during manufacturing and assembly of tool 10.

For example, scope 20 is calibrated to be level to mounting plate 50 as part of the fabrication/assembly process of tool 10. The horizontal cross-hair of sight 20 is calibrated to be level with the top plane of turntable 12 (i.e., horizontal to the world once tripod 14 is level and plumb).

The lasers are calibrated during assembly into housings 30, 32, and 34 to be vertical and aligned with the vertical cross-hair of scope 20 by rotating the lasers in their housings (as previously described). Angular laser calibration is done by pivoting housings 30, 32, or 34 of the lasers (as previously described). Micro adjustment is with screw 82 for each laser housing. Laser and scope cross-hair alignment can be checked and field calibrated if necessary. A vertical reference line from an object in the field or at or near the field could be used.

Operational setup, after calibration, is quick and easy. Tool 10 can be taken to the area to be gridded. Plugs 38 and 48 are connected to provide power to the lasers. The operator can sight through sight 20 to a landmark or reference point and establish an accurate reference direction for the vertical beam of laser L1. Laser L1 can be turned on by manually operating the appropriate switch 44. Any of lasers L2 and L3 can also be operated and would issue laser beams in orthogonal directions. As indicated in FIG. 6, in this embodiment the beam spread or fan of lasers L1, L2 and L3 is approximately 60°. Thus, these beams would spread and intersect the ground at several feet away from tool 10. That part of the laser beam would strike the ground or floor and project along the ground or floor in a line. In some conditions the line across the ground or floor, or along a measuring tape, may be visible to the human eye. However, as discussed in detail below, the line across the ground or floor does not have to be visible for some of the grid layout methods described herein to work.

Specifically, the beams of each laser L1, L2, L3 would expand both down to the ground or floor, but also expand or spread upward at an approximately 30 degree angle. The beam B would thus have intensity in its entire vertical plane. As will be discussed further, each laser L1, L2, and L3 essentially issues a relatively thin beam spread in a vertical plane, and which has a pre-set and known relationship with each other as well as sight 20, and turntable 12. This provides the worker with three vertically planar straight reference beams at orthogonal relationships with one another.

Also, turntable 12 can rotate to various 45° indexed positions from an initial position. This provides other known relationships and flexibility when using tool 10.

Tape measure 18 can be used to measure from the center of tool 10 (indicated by plumb bob 16) in any direction, including along the line or plane of any of lasers L1, L2 and L3. A worker could thus accurately measure spaced apart points along a laser-projected line.

Tool 10 is portable for easy and quick transport and set up, and is self-contained. Tool 10 is relatively inexpensive in the use of low-cost line lasers that can be mounted in calibrated orientation in housings 30, 32, and 34, and in the use of a relatively low cost rifle or optical sight (as compared to a survey transit). The other components are relatively non-complex and inexpensive.

C. Method

Several examples of utilization of tool 10 for plotting or laying out grids of points across an area will now be described.

1. EXAMPLE 1

Figure 7:
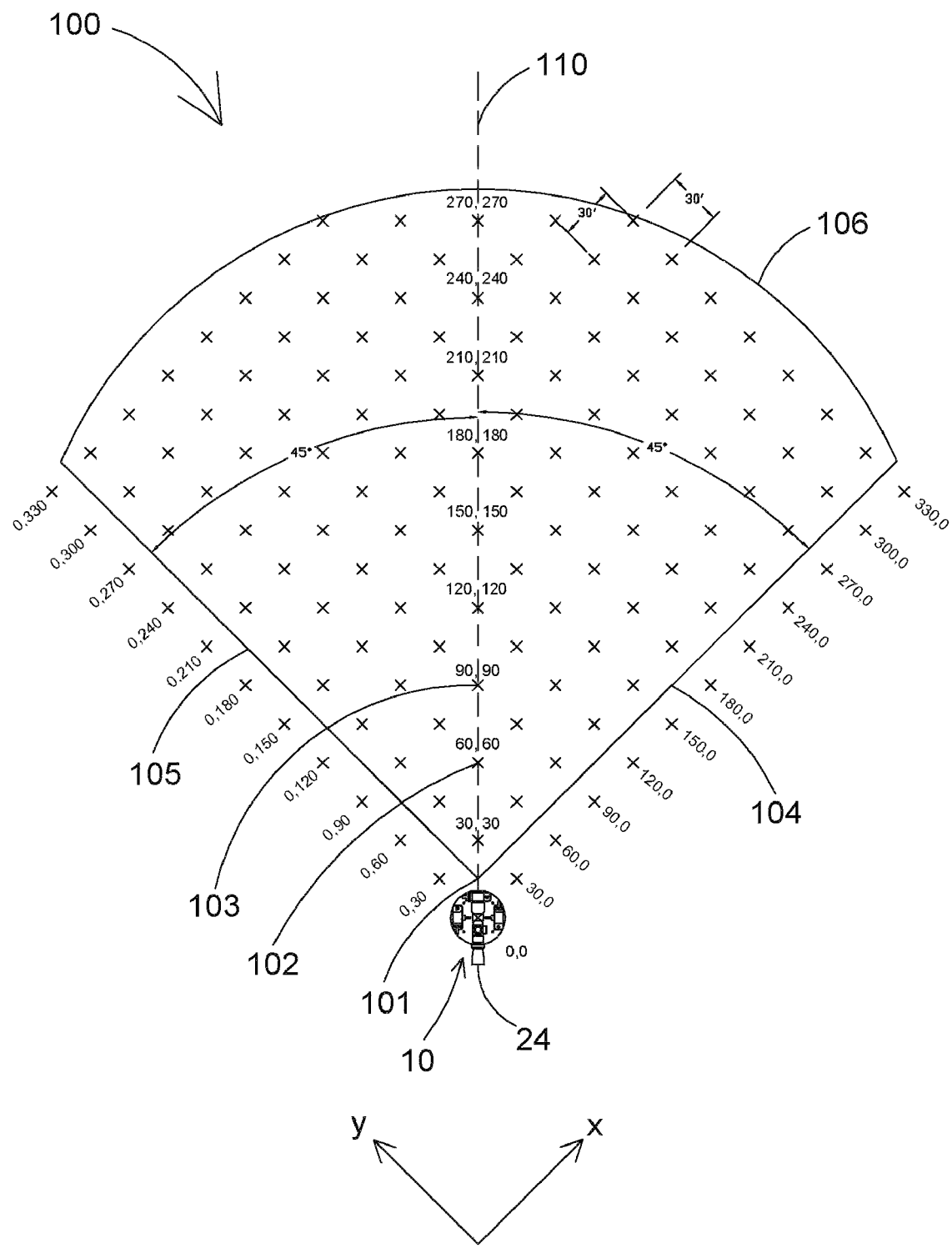
FIG. 7 is top plan view diagram of a baseball field with the tool of FIG. 1 diagrammatically illustrated at a first reference position.

FIG. 7 illustrates diagrammatically a top plan view of a baseball field 100. It also diagrammatically indicates a grid of over one hundred test points which must be located on field 100.

The application is to locate and mark equally spaced-apart test points across and around baseball field 100. In this example, the test points are in a grid of 30 ft by 30 ft squares. As indicated, the tests are distributed across field 100, but some points straddle the first and third base lines and extend slightly outside the outfield margin of baseball field 10 (see first base line 104 and third base line 105). These points are to be marked so that light readings can be subsequently taken at night from each point while the lighting system (not shown) for field 100) is operated.

The specific locations and spacing of test points can be selected according to accepted practices. For example, test points for measuring light uniformity and intensity for sports lighting are generally established by IESNA (Illuminating Engineering Society of North America), an organization that provides recommendations for sports lighting. However, a different grid spacing and location can be specified or arbitrarily set according to need or desire.

One conventional way of plotting these 30 by 30 foot test points is to measure 15 feet to the side of each of the first and third base lines with a tape measure and then try to lay the tape measure 15 feet outside first and third base lines all the way to the outfield perimeter 106. Test points would be marked at 30 ft intervals along each tape measures. The tape measures would also be extended back to where they intersect behind home plate 101 to mark the test point behind home plate. The tape measure then would be moved down the foul line 30 feet at a time and locations 30 feet apiece along the tape measure marked. This would be repeated and the workers would move across the field filling in the grid. In this way, the grid of 30 foot by 30 foot spacing test points would be plotted or developed across the field. However, this conventional method is subject to substantial error. As indicated in FIG. 7, there are approximately 12 rows of points along first and third base lines on a 300 foot field. No matter how much the workers would attempt to ensure a tape measure is exactly parallel to the foul line, it is very difficult to do. Therefore, it is conventional that two or more tape measures are used to geometrically try to make sure a tape measure is parallel all along its length. However, this takes a large amount of worker time and effort, especially if higher accuracy is desired. Usually more than one worker must place multiple tape measures and take multiple measurements; and this must be repeated every time a tape measure used to lay out grid points is moved. Wind, undulations in the ground, ground covering, inadvertent disruptions, and the like can affect whether a tape measure is actually straight. This method also relies on the ball field foul lines being accurate (perpendicular to each other) when they often are not. The human eye is usually not precise enough to confirm this. If the tape measure is not straight and any of the points are marked erroneously, when that point is then used to develop further points in the grid, it can inject further error into the procedure. The conventional practice utilizes several tapes and several workers. It is tedious and subject to substantial human error.

Therefore, in an improved method according to an exemplary embodiment of the present invention, the grid of test points is created as follows.

a) Establish Reference Line Based on Landmark

Tool 10, with turntable 12 in a level or horizontal and a rotationally indexed position, is set up on the ground so that plumb bob 16 hangs directly over the tip of home base 101 (at the intersection of first base and third base lines 104 and 105 with home base 101). A worker looks through eye piece 24 of sight 20 and adjusts tripod 14 so that its vertical cross-hair is aligned through the landmarks of (a) the center of pitching mound 102 and (b) the center of second base 103. In this manner, the landmark(s) of home base 101, pitchers mound 102, and second base 103 are used as three points to create an initial reference line 110 that bisects field 100 (see FIG. 7). These "landmarks" are normally in fixed or repeatable positions, and have normally been carefully laid out in a line. Therefore they can usually be relied upon as references. Landmarks can be single or plural locations, objects, lines, or other features on, near, or otherwise related to the field.

b) Sight First and Third Base Lines

Once center reference line 110 is established through the landmarks, upper plate 60 of turntable 12 of tool 10 is rotated 45° (to preset detent settings) in opposite directions to locate first and third base lines 104 and 105, respectively. It is to be understood that many times the actual marked base lines are not perfectly 90° from each other, or 45° from the home-to-second-base-line 110. This is a way to check if those base lines are correct. However, as can be appreciated by viewing FIG. 7, it is not necessarily relevant if the baselines are not straight or correct for laying out the grid.

On the other hand, if it is desirable to reference the grid at least in part on the first and third base lines, and if second base does not bisect the first and third base lines 104 and 105, adjustments to the position of tool 10 can be made if desired. For example, fairly quick measurements can be made and reference line 110 can be set to more accurately bisect field 100. One adjustment or compensation could be as follows. Reference line 112 would not be exactly 45 degrees from line 110. Rather it will be directly on top of the first base foul line. The method described later would be followed, moving the tool 10 down line 112 and establishing transverse grid lines perpendicular to line 112. These transverse lines would not be parallel to the third base foul line, however.

Locate and Mark Grid Starting Point

Tool 10 is then rotated 135° from either first or third base lines 104 or 105 (or 180° from home to second base line 110) to locate the first or starting grid point (what will also be sometimes called test station 0,0), which is located behind home plate 101. The free or distal end of the tape of tape measure 18 is positioned right under plumb bob 16 at home plate 101. For example, it can be fixed in position by a screw driver or stake in the ground right next to the pointed end of home plate 101. Many measuring tapes have a ring or opening at their distal end. A screw driver or other member could pushed into the ground through such ring or opening in that end and the tape.

The measuring tape is then unreeled and pulled backwards from home plate 101 as close along line 110 as possible until its 21.2 foot mark is exposed. This distance will change if the grid spacing changes. Based on the straight-forward geometrical calculation $a^2+b^2=c^2$ relative the hypotenuse of an isosceles triangle (e.g. a hypotenuse of 21 feet 2 inches correlates to an isosceles triangle having 15 foot sides). Toggle switch 44 for laser L1 can be turned on. A worker can stand behind home 101 more than 21.2 feet away, with tape measure pulled backward as close in line with home 101, pitchers mound 102, and second base 103, as the worker deems correct. The worker would look at laser L1 and move his/her head side to side relatively quickly to try to put the worker's eye in the vertical plane of laser beam B of laser L1. By known principles of physics and light, when a worker's eye enters the plane of the laser beam B, there will be a perceived higher intensity or "flash" or "star burst" of light, even though the beam may not be seen by the worker. This phenomenon occurs when the eye is directly in the plane of light in its highest intensity portion. It is a similar effect as occurs when a person's eye comes directly in line with the center (highest) intensity portion of a flashlight beam. Even though you can see intensity from the flashlight when off-axis with your eye, when the center intensity axis crosses the eye, there is a perceived "flash". Thus, by the worker aligning his or her eye in the vertical plane of laser L1, the worker identifies and can then establish the location of line 110 and can place the measuring tape directly along that line and 21.2 feet can be measured and marked. The ability to perceive the "flash" of laser light has been found to work even in daylight conditions and when beam B from laser L1 can not be seen with the human eye.

In these ways, the tape can accurately be pulled back behind home plate 101 and 21.2 feet measured. This would be starting reference point or test station 0,0 for the grid. This would be the intersection of grid lines that are offset from the first and third base lines 15 feet (for a 30 ft by 30 ft pattern grid). Its intersection point, namely test station 0,0, can be marked with a flag or other physical or visible marker. A few non-limiting examples include a small plate, a patch of paint, a stake, a ring, or a flag. Other types of markers or human or machine-perceivable indicia could be used by a worker to establish a precise location on the ground for that test point.

Alternatively, to mark the test point behind home plate, a worker can sight through scope 20 to make sure the measuring tape is directly on the vertical cross-hair, which would correspond with line 110. The worker then measures 21.2 feet.

d) Establish Grid Reference Line for First Dimension of Field.

Once test station 0,0 is established, tool 10 is moved from home base 101 to test station 0,0 (to the position shown in FIG. 7). Plumb bob 16 is positioned right over location 0,0 that has been previously marked. Tool 10 is positioned so that, in an indexed position, sighting axis 28 is directly in line with line 110 from test station 0,0 all the way to the outfield margin 106 (see FIG. 7).

Figure 8:
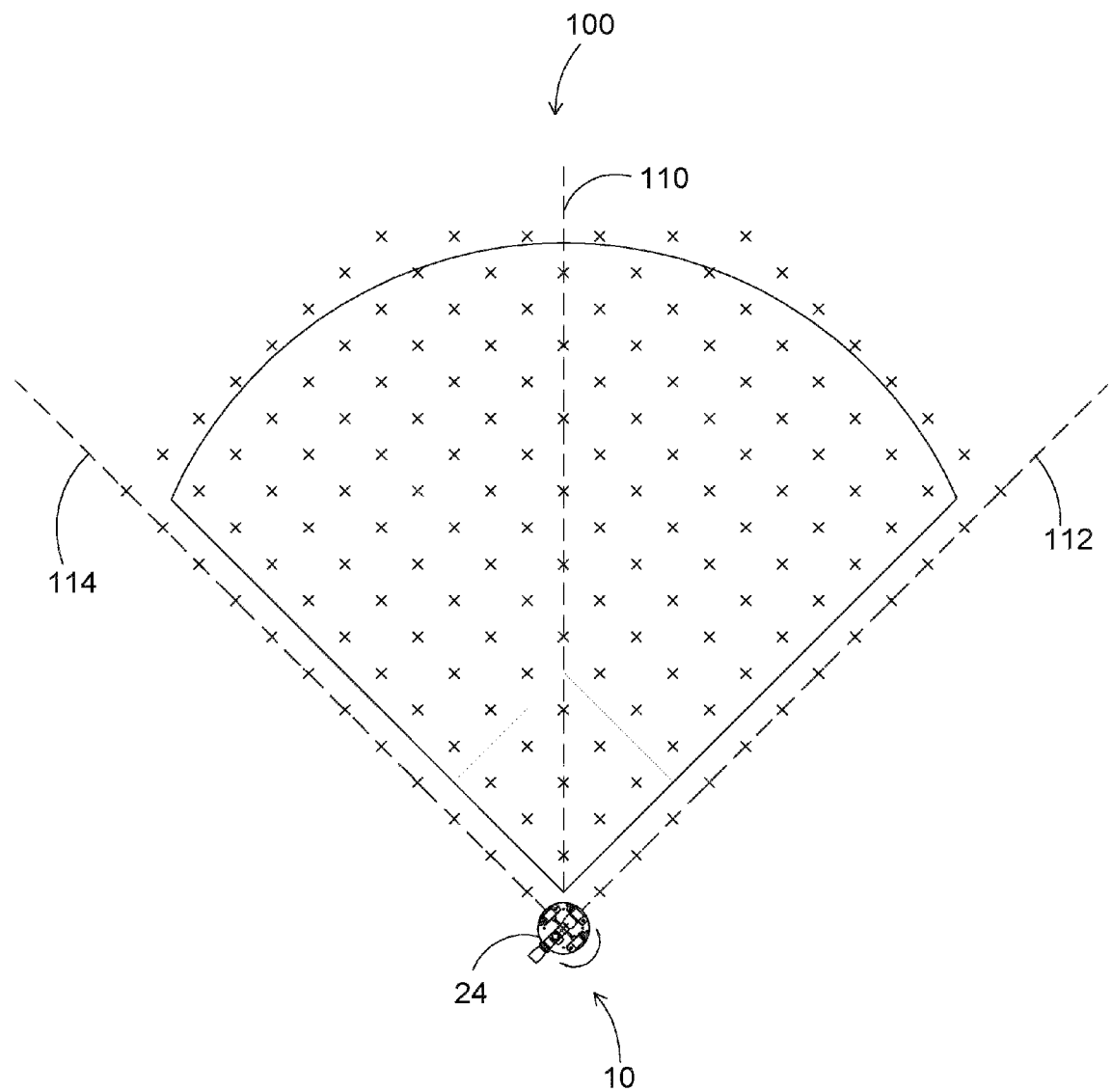
FIG. 8 is similar to FIG. 7 but shows the tool rotated to define a first reference line along the first base line of the baseball field.

Turntable 12 is then rotated to a right hand 45° indexed position (see FIG. 8). This establishes, through aiming axis 28 and laser L1, a first base line reference line 112 which is offset 15 ft outside of the nominal first base line 104. Preset detents accurately position tool 10 at this rotated 45° position. Therefore, the worker(s) does/do not have to do any measuring or other work to establish reference line 112. The worker has confirmed that tool 10 was aligned with landmark reference line 110 and was at test station 0,0. Thus, rotation to the first right hand indexed position automatically sets tool 10, specifically sight 20 and laser L1, at a 45 degree angle to line 110.

This first base side reference line 112 is essentially a grid reference line for one dimension of field 100. It is a straight line that extends 15 feet outside but along the entire one side of field 100. Thus, an accurate straight reference line for one side of field 100 is quickly established, and it is based or referenced from the landmark reference line 110.

As indicated diagrammatically in FIG. 7, the grid points along first base reference line 112 (FIG. 8) essentially could comprise the X-axis of the two-dimensional grid, while the points along a third base reference line 114 (FIG. 8) could comprise the Y-axis of the two dimensional grid.

e) Mark Test Points Along First Base Reference Line.

With tool 10 at test station 0,0 and sight 20 indexed 45 degrees to the right as shown in FIG. 8, tape measure 18 is pulled taut from plumb bob location 16 generally along sighted line 112 to the far end of the field (the tape measure of appropriate length is used). Laser L1 is or has been turned on, and the worker uses the previously-described procedure of moving his or her eye side-to-side relative to tool 10 until the worker senses the "flash" from laser L1. The flash indicates the exact location for grid line 112. The worker would then mark the laser-indicated line 112 with a flag (e.g. by placing a flag or other marker on what is indicated to be line 112. The worker would usually also mark one of the grid points with that flag. Because the worker knows the grid points are in 30 foot increments from test station 0,0, the worker would mark, for example, the 300 foot grid point with the marker.

The worker can work back to tool 10 by locating markers or flags at 30 ft (or whatever other spacing is used) increments at the appropriate distances marked along the tape. At each 30 ft increment, the worker could simply quickly confirm the laser flash in the eye to ensure correct alignment along line 112 is maintained.

As indicated diagrammatically in FIG. 7, the worker would be marking grid points 30,0; 60,0; 90,0; . . . ; 300,0 along line 112 (numbers represent distance in feet).

In this manner, a straight line from test station 0,0 at a 45° angle from center reference line 110 can be quickly and efficiently established. The worker can then quickly and efficiently use the tape measure to mark the 30 ft increments and continuously double check alignment of the tape measure.

f) Establish Grid Reference Line for Second Dimension of Field.

The worker then simply turns on laser L3 to establish a third base side reference line 114 (see FIG. 8). As laser L3 is 90° from laser L1, tool 10 does not have to be re-positioned and turntable 12 does not have to be rotated. The operator just switches on the appropriate toggle switch 44 for laser L3. The worker can turn off the first base line laser L1 if desired. Line 114 is therefore at a calibrated 90 degree angle to reference line 112. Line 114 also originates at test station 0,0.

Similarly to described for the first base side, tape measure 18 is moved over to the third base side and pulled taut to the end of the field generally parallel to the third base line 105. The worker looks back at laser L3 to perceive the "flash". Once the flash is perceived, the worker lays down the stretched tape measure in line with that flash and marks off points at 30 ft increments relative to test station 0,0. This establishes a beginning reference line in a second dimension relative to field 100.

At this stage, as indicated diagrammatically at FIG. 7, grid points 0,30; 0,60; 0,90; . . . ; 0,300 would be marked on field 100. Essentially the X- and Y-axes for the grid for field 100 would be marked.

g) Complete the Grid.

Figure 9:
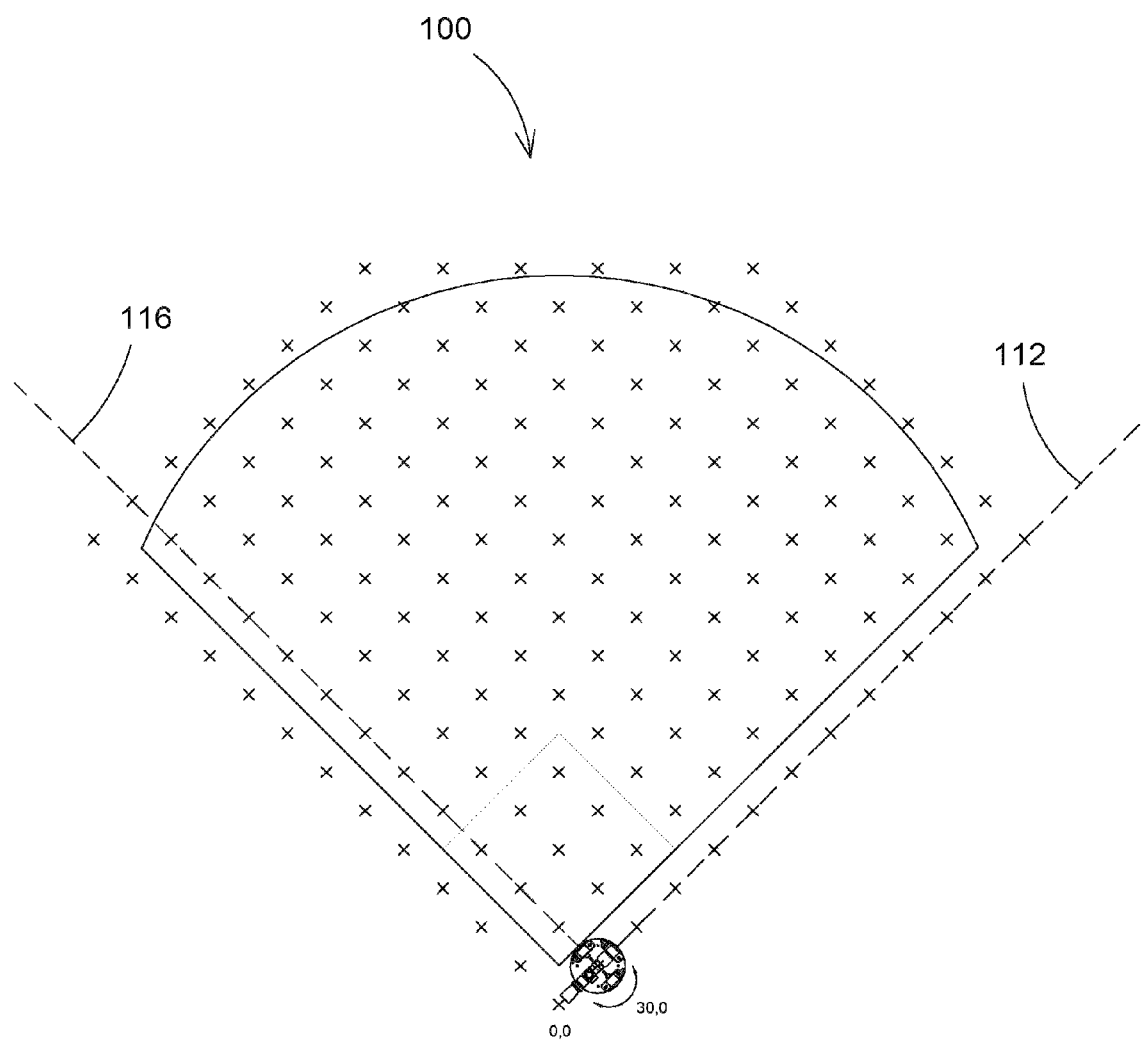
FIG. 9 is similar to FIG. 8 but illustrates the establishment of a second reference line along the third base line of the baseball field.

Tool 10 is picked up and moved thirty feet to the test point marked location 30,0 (FIG. 9). Sight 20 is used to sight down line 112 to ensure tool 10 is aligned correctly relative to first base side reference line 112. The worker could sight along the markers that have been set out along line 112. Tape measure 18 is pulled out taut as close to parallel to the markers of line 114 as possible.

As with previously described steps, the worker at the end of the field who has pulled the tape taut looks for the flash from laser L3 and establishes an accurate line for marking test locations at 30 ft increments along this next line 116. The worker then uses the tape measure to mark the thirty foot intervals along new line 116 and periodically (or continuously) checks to make sure the tape measure is along an accurate line from laser L3 by confirming so by confirming the tape is laid out along a vertical plane in line with the "flash". As can be appreciated, the worker can also periodically sight through sight 20 to make sure that tool 10 is accurately aligned with the marked flags along the first base line reference 112 as a double check of positioning of tool 10. When the markers have been laid out along line 116, a second row of markers of the grid will have been completed in a second or transverse direction across the field relative to reference line 112, which extends in a first direction relative to field 100.

This can then be repeated in a left-to-right direction for each of the marked reference points along first base line reference line 112 (i.e., 30,0; 60,0; 90,0; . . . ; 300,0). Tool 10 is moved successively downline (or toward the outfield fence) in FIG. 9 in thirty foot increments (to point 60.0 along line 112; then to point 90,0 then to point 120,0; etc.) after being accurately positioned relative to line 112 using sight 20, and having markers set out along each of those transverse lines. The markers that have already been set along line 112 are used to ensure correct position of tool 10 at each thirty foot interval along line 112, and reference line 112 is used to confirm the correct orientation of sight 20 and thus laser L3. Therefore, for each transverse line across field 100, it is quick and efficient to set and confirm accuracy for the line.

Figure 10:
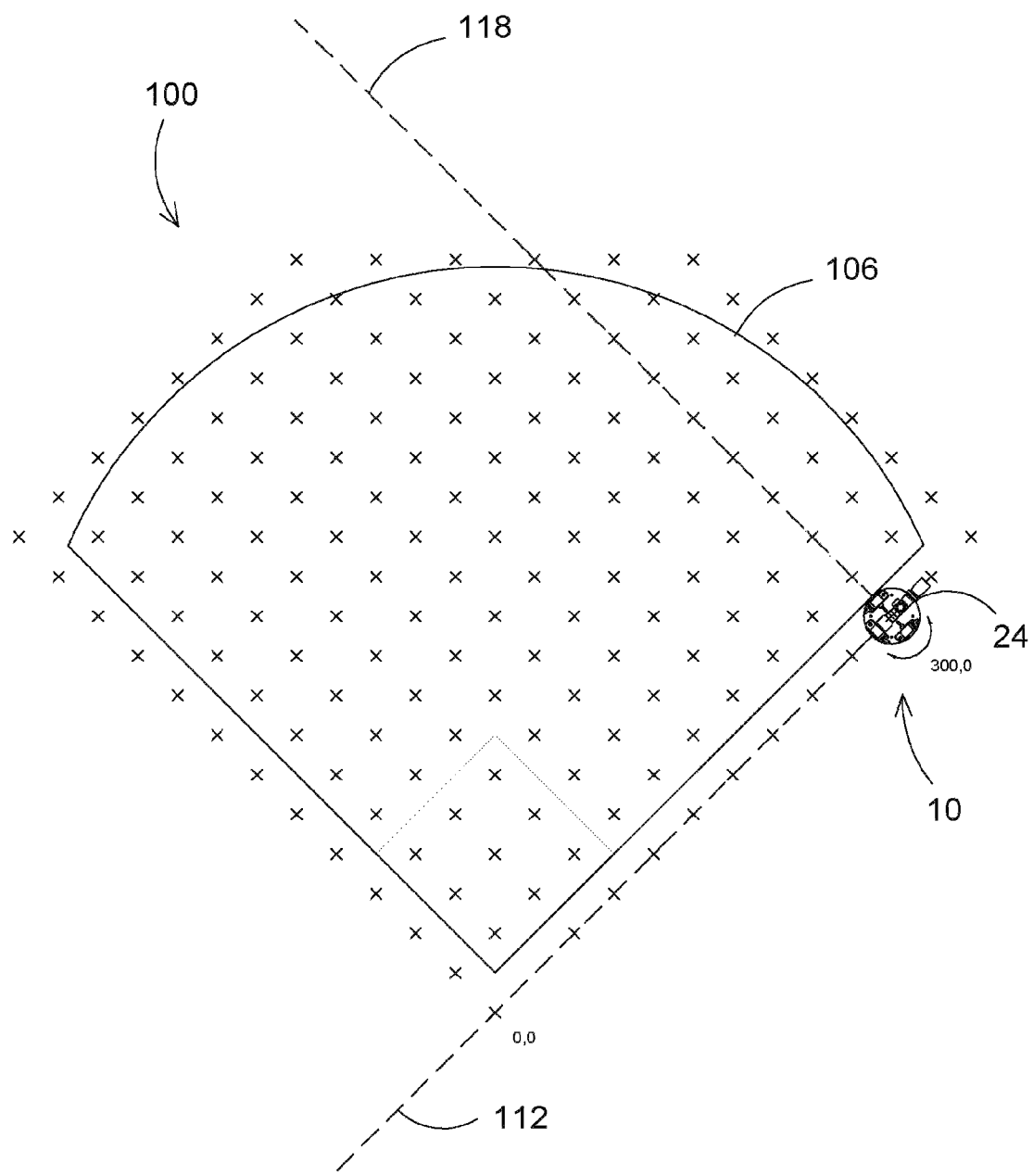
FIG. 10 is similar to FIG. 9 but shows a subsequent step of beginning to lay out points across the baseball field by projecting across the field a transverse reference line which is transverse to the first base reference line.

Once the grid has been completed more than halfway to the right side of field 100 going along the first reference direction (line 112), turntable can be rotated 180 degrees so that the sight 20 and laser L1 are directed back towards home plate 101 along first base reference line 112 (see FIG. 10). This would allow the worker to continuously check through scope 20 correct alignment along reference line 112. This allows the sight 20 to sight down a longer distance of line 112 than if approaching outfield border 106. To lay out the transverse lines across field 100, tool 10 would still be moved in 30 foot increments downline along line 112 but laser L3 would be turned off and laser L2 turned on and used to position tape measure 18 transversely across field 100 to finish off the rows of grid points in field all the way to the right.

With an area shaped like baseball field 100, not all transverse rows will have the same number of reference points to mark. The workers will normally have some idea of what area to cover with marked points.

It can therefore be appreciated that portable tool 10, with relatively inexpensive lasers, optical sight, and tape measure (which can be extended at least most of the way to the far margins of the field or area to be gridded), facilitates marking of the points of the grid relatively quickly and efficiently, with a relatively high accuracy. The accuracy has been found to be normally better than using only measuring tapes when properly used. The worker has a number of ways to quickly, efficiently, and effectively re-check the accuracy of the layout as the grid is being marked out. It has been found that the method can save substantial time, at least relative to conventional tape measure based methods. In many cases, time savings can be on the order of one-half of using just tape measures.

2. EXAMPLE 2

A rectangular sports field such as football field 200 (FIG. 11) can also be gridded in a similar method as described regarding baseball field 100 in Example 1.

The method of Example 2 is, however, somewhat simpler because the starting reference that is used is an already marked yard line across football field 200. In this Example 2, tool 10 is placed (see FIG. 11) directly along a pre-chalked or painted 45 yard line (in FIG. 11 the 45 yard line above the 50 yard line). It could be any yard line. It also could be some landmark such as goal posts or some in-ground markers that have been carefully and accurately pre-positioned.

Figure 11:
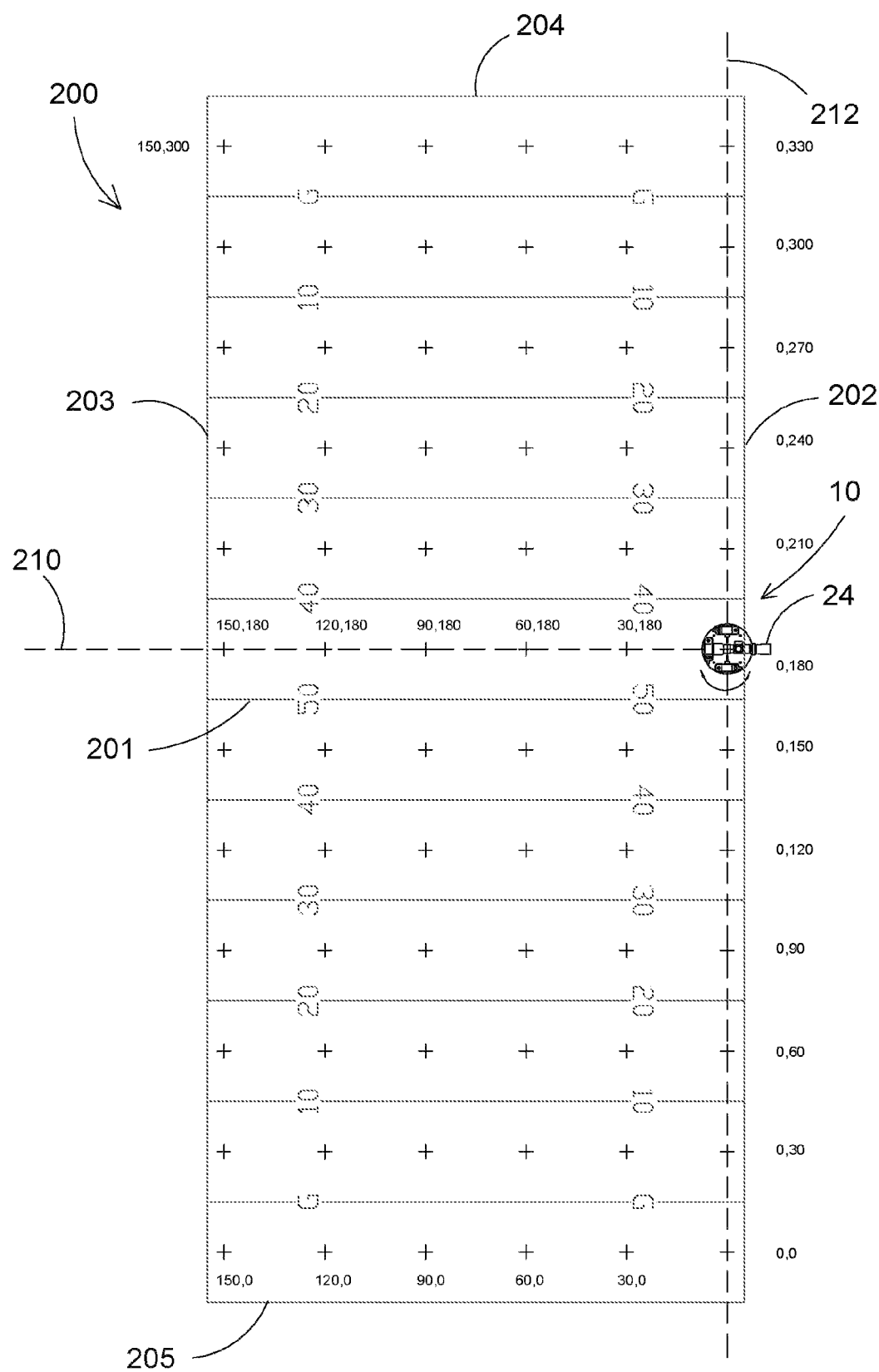
FIG. 11 is a top plan view of a football field illustrating the use of the tool of FIG. 1 to begin layout of a grid of spaced apart reference points across the football field.

As diagrammatically illustrated in FIG. 11, the grid test points are all inside the boundaries of field 200. Tool 10 is initially positioned along the selected 45 yard line at a measured distance inside the right side line 202. As with the grid for Example 1 relative a baseball field, the grid relative to a football field is pre-known to the worker.

For example, a regulation professional, college, or high school football field in the United States is 360 feet long and 160 feet wide. For a grid with 30-by-30 foot spacing of test points in the two dimensions or directions, there would be six test points (spanning 150 feet) between sidelines 202 and 203, with test points nearest each sideline 202 and 203 being spaced inside its respective side line by 5 feet (to account for the other 10 feet of the 160 foot width of the field). There would be twelve test points (accounting for 330 feet) between end zone lines 204 and 205, with test points closest to the end zone lines being spaced inside those lines fifteen feet (accounting for the other 30 feet of the 360 foot length of the field).

Tool 10 can therefore be initially positioned (with plumb bob) by placing tool 10 a measured five feet inside sideline 202 along the chosen initial 45 yard line. That point can be marked with a flag or other marker. Sight 20 can be used to sight down that 45 yard line as a starting reference (see FIG. 11). Correctly pre-calibrated and arranged, tool 10 would thus allow sighting and confirmation of an accurate line 210 across field 200 between right and left sidelines 202 and 203. Laser 1 can be turned on and tape measure 18 extended along this beginning reference line 210 to the far side of field 200. The worker can position tape 18 along line 210 by confirming the "flash" from laser L1 when looking back at laser L1. Flags or other markers can then be placed at the appropriate measured locations along tape measure (here at 30 foot increments) to mark a first set of test points across the width of field 200. This is across field in a first direction or dimension of the area to be gridded. As described with Example 1, the worker can make sure the tape measure is along line 210 by looking for the flash of laser L1, and continue to check it as the worker marks those locations along line 210.

Lasers L2 and L3 can be turned on to establish line 212 (see FIG. 11). The orthogonal relationship of the beams of lasers L2 and L3 to that of L1 (and to the sight 20), ensures that the beams of lasers L2 and L3 will project along a line that is orthogonal to reference line 210. No other measuring or checking is needed to establish this.

Tape measure 18 can be pulled first in the direction of the lower half of field 200 in FIG. 11 and those test points marked while confirming correct positioning of the tape measure by the worker sensing the flash of laser L3. As diagrammatically indicated in FIG. 11, this would mark the 0,0; 0,30; 0,60; 0,90; 0,120; and 0,150 foot points of the two dimensional 30 foot by 30 foot grid (point 0,180 has already been marked). This is possible with a 300 foot tape measure.

The same can be done for the upper half of field 200 by then pulling tape measure 18 taut generally along line 212 from tool 10 to or past end zone line 204. The worker would ensure tape 18 is along that line be using the "flash" technique with laser L2. This would complete one row of marked test points by marking points 0,210; 0,240; 0,270; 0; 300; and 0,330 with tape measure 18.

The remainder of grid across field 200 can be marked by moving tool 10 sequentially across the field from line 212 (and point 0,180) near right sideline 200 to left sideline 203 (i.e. to point 30,180; then point 60,180; then point 90,180; then point 120,180; and then point 150,180) and using lasers L2 and L3 and tape measure 18 to mark out the test points at each point, as was done to create the marked points along line 212. The correct orientation of lasers L2 and L3 can be checked at each point along line 210 by using sight 20 to sight down the marked points along line 210. This ensures the beams B from lasers L2 and L3 are perpendicular to line 212. Using the "flash" technique and the tape measure 18, the worker checks accuracy of the test point locations above and below line 212 in FIG. 11.

Figure 12:
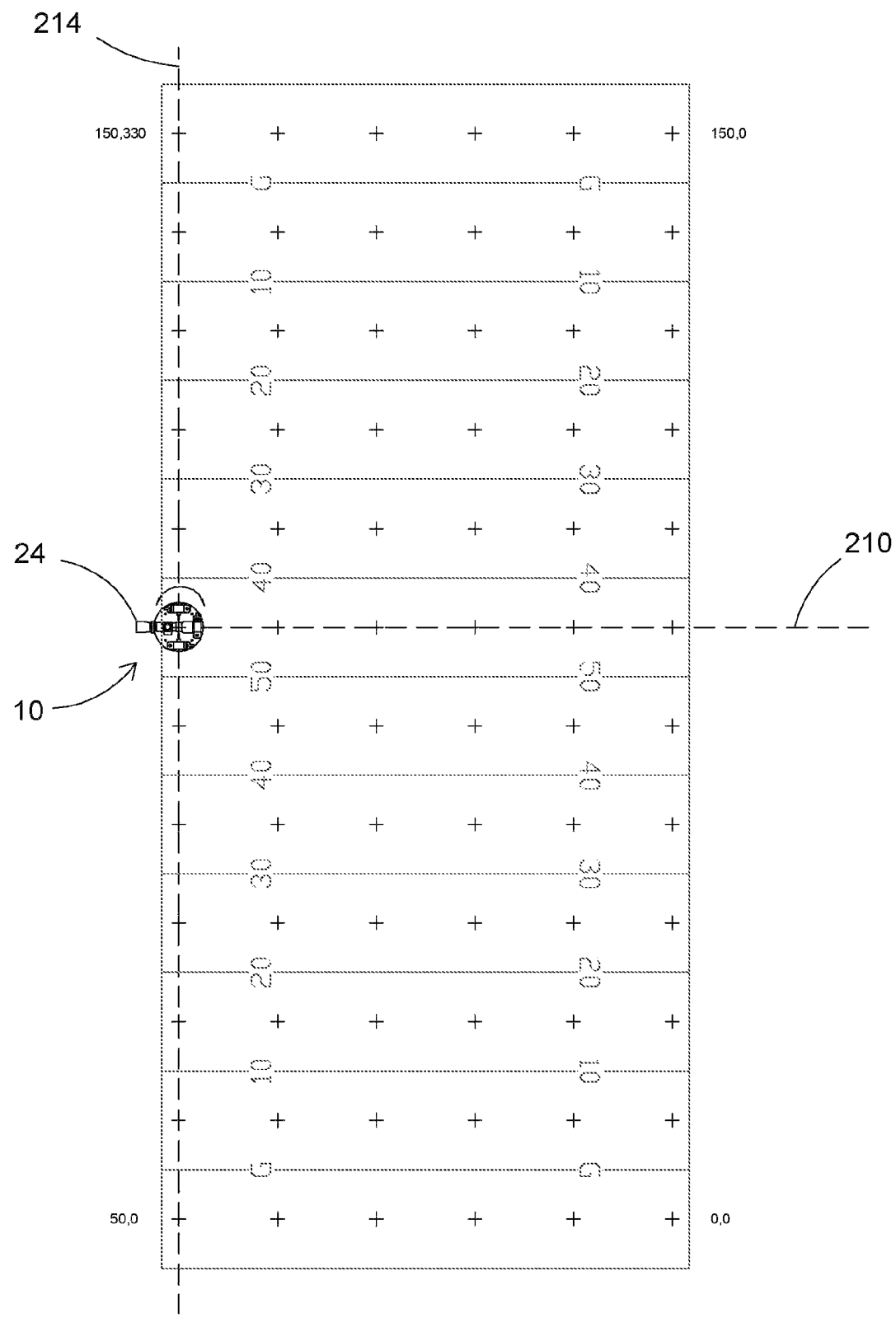
FIG. 12 is similar to FIG. 11 but shows the tool moved to a different position to complete the grid layout of the football field.

Similar to described in Example 1, and as indicated in FIG. 12, after tool 10 has been moved half way across field 200 (e.g. to point 90,180 in FIG. 11), tool 10 can be turned 180° around or turntable 12 rotated 180° to point sight 20 back the opposite direction along center line 210 to double check correct positioning of tool 10 and correct orientation of lasers L2 and L3.

Once the final row of markers has been laid out along line 214, the complete grid for field 200 would be finished.

It can be seen that this can be somewhat simpler than the baseball field. It may be possible to use landmarks such as goal posts, in-ground markers, or objects on or around the field as the starting reference, similar to baseball fields. It can be seen, however, that this is quick, efficient and can be quite accurate and done with minimum labor resources.

Conventionally, the markers would be placed at the grid locations on either the baseball field 100 or football field 200 during daylight because the methods of Examples 1 and 2 can be conducted in daylight. Light intensity and uniformity measurements would normally be taken at night time, while the lighting system is operating, to confirm whether sufficient uniformity and intensity standards are met at the accurately located test points across the field.

3. EXAMPLE 3

Figure 14:
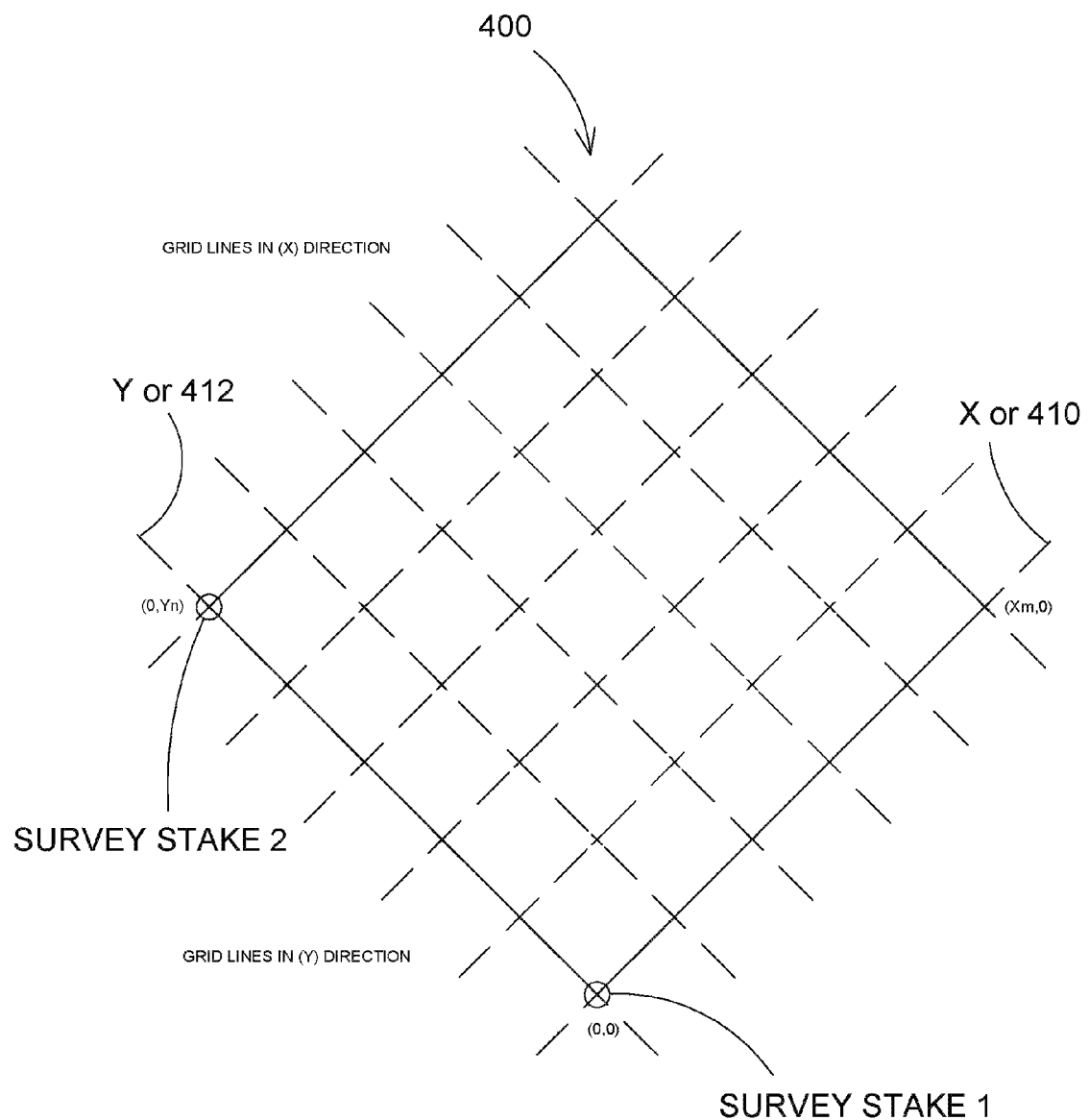
FIG. 14 is a diagrammatic illustration of another example of laying out points or lines over an area.

FIG. 14 illustrates another example. An area 400, such as a vacant lot, needs to have a grid of lines marked across it. The "landmarks" in this case are two surveyed stakes or markers that have previously been fixed in the ground (e.g. pursuant to a survey of the lot). It is to be understood that two other established starting points could alternatively be utilized. The starting point(s) can be based on whatever is important to any application. They typically are based on some feature or dimension of the property or area to which the grid is being applied.

In this case, similar procedures to Example 2 can be followed to set up a grid of perpendicular lines extending across area 400. Once a straight line 412 is established using, e.g., laser L1 of tool 10 in what is indicated as the "Y" direction in FIG. 14 (a line between the surveyed points (0,0) and $(0,Y_n)$), a second laser can be turned on and used to establish what is indicated to be the "X" axis 410 in FIG. 14 (a line between coordinate (0,0) and $(X_m,0)$). At this point, the X and Y axes of a two-dimensional coordinate system are established. Thereafter, measuring tapes can be used to measure whatever distances are desired for grid lines in either the X or Y directions along those established axes 410 and 412. For example, if a regular, evenly spaced set of lines across area 400 is desired, equal measures along each axis would be marked and tool 10 moved sequentially to each point and perpendicular lines established across area 400. In this case it is the lines that are desired to be marked across area 400. A chalk line or other line marking method can be snapped to mark the lines across the area. When completed, a grid of perpendicular lines would be marked on area 400.

The lines could be partially across area 400. An example would be to mark parking space lines for a plurality of parking spaces in area 400. Chalk lines or markers could be used to indicate where the painted lines would be positioned in the area. Area 400 could be a paved or concrete area.

It is to be appreciated that the area that is to be gridded could be marked with points or lines or both. The grid does not have to comprise equally spaced points or lines. They could also be at other than 90 degrees to the reference axes or reference line.

4. EXAMPLE 4

A further example can be explained with reference to any of Examples 1-4. If X and Y axes are established with tool 10 and a tape measure or other measuring method, essentially a two-dimensional coordinate system has been established relative to an area. Instead of a grid across the area, any shape of known X-Y coordinates could be marked on or near the area by using the X-Y axes and measuring to the coordinates from those axes. For example, a non-regular shape could be marked out on area 400 of FIG. 14 without marking or measuring the grid lines across area 400, by simply measuring from the axes 410 and 412 to X,Y coordinates that define the shape. It could be used, for example, to mark the outline of an non-regular shaped building on an area of ground. It could be used to mark out a picture or shape (e.g. a star shape).

For example, all types of shapes could be marked on an area. The shapes could have straight lines or curved lines, or both. For example, the methods and apparatus described above could be used to lay out the baseball field of FIG. 7, including the baselines 104 and 105, as well as the curved outfield line 106. The size and shape of the field can be pre-determined and converted to X-Y coordinates. Baselines 104 and 105 could be used as X-Y axes, with the tip of home plate the origin (0,0), or, as shown in FIG. 7, the lines (0,0), (330,0) and (0,0), (0,330) could be the X-Y axes with (0,0) as the origin. The known coordinates for points forming the curved outfield line 106 could be measured and marked, to complete the layout of the field 100, even with non-straight-line shapes or portions. This method can be applied to other shapes or patterns including on non-sports-field applications.

D. Options and Alternatives

The foregoing exemplary embodiments are by way of example only and not by limitation. Variations obvious to those skilled in the art will be included within the invention which is defined solely by its claims. Some non-limiting examples of options and alternatives are set forth below.

As can be appreciated, the laying out of an accurate grid in an efficient manner can be applied to a variety of areas other than sports fields. Some have been previously mentioned, such as parking lots, construction sites, and the like. Another example of an application would be soil testing where soil samples are taken at test locations across a grid to map soil characteristics for an area. Another is ground water test locations. A further example is to layout a grid of strings or ropes at an archeological dig site.

The grid, so to speak, does not have to have equally spaced apart test location or cover an entire area. For example, methods similar to aspects of the invention described above could be used to lay out the boundaries, base paths, yard lines, and the like of athletic fields. The accuracy and efficiency of these aspects of the invention allows it/them to be used as almost a surveying method and tool. Others applications and variations are possible.

The precise nature of the equipment used for tool 10 can vary according to need or desire. In one embodiment, it may not even be necessary to use sight 20. The flash technique, described above, can be used with one or more lasers to establish a first reference line, and then transverse reference lines to the first reference line. Only one laser may be needed. It simply can be rotated or the tool repositioned to the desired direction(s). The pre-calibrated indexing could be advantageously used in this respect. As indicated in FIG. 13, beam B from laser L1, L2, or L3 would project in a vertical plane. At some point outward from the laser, beam B would intersect with the ground or floor. It essentially would project a straight line along the ground or floor. In some situations, the beam may be perceivable along the ground or floor and, thus, provide a straight reference line with which the worker can line up a measuring tape or confirm the orientation of the tool 10 to a reference direction. For example, beam B may be visible on some types of measuring tapes. The worker simply confirms the tape is straight by confirming the beam B is on the tape along its length.

As can be appreciated, the test points can be established by specifications or convention, or by design. For the example of sports lighting, as well as other wide area lighting testing, reference can be taken to the IESNA Lighting Reference Handbook with respect to lighting uniformity and intensity minimums for a variety of sports fields. Similar authorities or reference works are available for other applications.

Lasers similar to those described above can be added to a surveyor's theodolite or transit. While more expensive, this would allow for accurate angle measurement. This would be useful for verifying exact field shape and size. Also, the lasers on preset 90 degree increments along with the method described above would allow quick and accurate grid point layout.

Other methods for measuring distance may be utilized. Rather than utilizing a tape measure, a rangefinder (similar to Model TruPulse™ 200 from Laser Technology, Centennial, Colo. USA) provides relatively good accuracy (within ½ foot) at a distance of several hundred feet. A solid plate or other flat reflective surface would be mounted on the tripod. The user would place flags or other markers as described above at the appropriate grid point locations, aligning him/herself with the laser "flash" and using the rangefinder to find the correct distance.

Instead of having a worker visually sensing the "flash" of the laser beam, a laser sensor could be used to sense if the worker is aligned with the laser. An example is a Model 54 or 56 Thunder laser detector from Apache Technologies, Dayton, Ohio USA (+/−45 degree reception angle, accurate to within ⅛ inch, and truth at up to 500 feet whether laser beam is visible or not). It detects laser energy and responds with lights, a display, or sound to indicate closeness of proximity to the beam, and then when the detector is dead on the beam.

Visible lasers are not necessarily required. For example, an infrared (IR) laser could be used. An IR detector could be used at a position away from the IR laser to detect when in alignment with the non-visible IR laser.

What is claimed is:

1. A method of laying out a grid of lines or points across an area whether or not symmetrical comprising:
    a. designating a starting reference point at or near the area based on an a priori known relationship to an existing feature or object at or near the area;
    b. projecting with a laser beam a first reference line intersecting the first reference point and extending in a direction relative to a first dimension related to the area;
    c. designating and marking a set of first line reference points along the first reference line with reference to measured distance and the laser beam;
    d. projecting with a laser beam a transverse reference line from each of the set of first line reference points at least partially across and in a direction relative to a second dimension related to the area and;
    e. designating and marking a set of second line reference points along each of the transverse reference lines with reference to distance along each transverse reference line and the laser beam at each of said first line reference points;
    f. so that a grid of lines or points are identified and marked across the area correlated to at least both distance and a laser beam is created;
    g. taking a measurement of a valve in addition to location for a plurality of said marked reference points.

2. The method of claim 1 wherein the laser beam is spread generally in a plane.

3. The method of claim 2 wherein the plane is generally vertical.

4. The method of claim 2 wherein the plane is vertical.

5. The method of claim 1 wherein the area has a length and a width and the first direction corresponds with the length.

6. The method of claim 5 wherein the second direction corresponds with the width.

7. The method of claim 1 wherein the first line reference points are equally spaced.

8. The method of claim 7 wherein the second line reference points are equally spaced.

9. The method of claim 1 wherein the first and second line reference lines or points are equally spaced.

10. The method of claim 1 wherein the step of designating a starting reference point comprises marking the line or point.

11. The method of claim 10 wherein the area comprises ground and the marking comprises placing a physical marker on each line or point.

12. The method of claim 11 wherein the physical marker comprises a flag.

13. The method of claim 1 wherein the step of designating either the set of said first line reference points or said second line reference points comprises measuring.

14. The method of claim 13 wherein the measuring comprises using a measuring tape.

15. The method of claim 1 further comprising correlating the starting reference point to a visible object having a known relationship to the area.

16. The method of claim 15 wherein the visible object is in the area.

17. The method of claim 1 wherein the area comprises a sports field.

18. The method of claim 1 wherein the area comprises a parking lot.

19. The method of claim 1 wherein the area comprises an area to be illuminated.

20. The method of claim 19 wherein the reference points are correlated to light intensity and uniformity test points.

21. The method of claim 1 wherein the laser beam comprises visible light.

22. The method of claim 21 wherein the step of designating said first line and said second line reference points comprises a worker sensing the visible light with the worker's eyes.

23. A method of laying out a grid of points across an area of a sports field to be illuminated whether or not symmetrical comprising:
    a. locating and marking a starting point on or near the field based on an a priori known relationship to an existing feature or object at or near the area;
    b. extending a laser beam from the starting point in a direction to create a reference line for a first dimension of the sports field;
    c. marking points along the first dimension at predetermined distances with reference to measured distance and the laser beam;
    d. extending a laser beam from the starting point in a second direction orthogonal to the reference line in the sports field to create a second dimension;
    e. marking points along the second dimension at predetermined distances with reference to distance along each transverse reference line and the laser beam at each of said first line reference points;
    f. extending a laser beam from the marked points on the first dimension parallel to the second dimension to create additional reference lines;
    g. marking points along the additional reference lines at predetermined distances to create a grid of points on the sports field;
    h. taking a measurement of a valve in addition to location for a plurality of said marked reference points.

24. The method of claim 23 wherein the laser beam comprises visible light.

25. The method of claim 24 where in the step of designating said first line and said second line reference points comprises a worker sensing the visible light with the worker's eyes.

26. A method of laying out a grid of points or lines across a lighting target to be illuminated whether or not symmetrical comprising:
    a. locating and marking a starting point on or near the lighting target based on an a priori known relationship to an existing feature or object at or near the area;
    b. extending a vertical plane laser beam from the starting point to create a first dimension of the area intersecting the starting point;
    c. marking points along the first dimension at preselected distances ending at a final point with reference to measured distance and the laser beam;
    d. extending a plurality of laser beams orthogonal to the first dimension at the starting point to create additional reference lines;

e. marking points on the additional reference lines at preselected distances with reference to distance along each transverse reference line and the laser beam at each of said first line reference points;

f. repeating steps d. and e. at additional points along the first dimension and stopping at the final point; g. taking a measurement of a valve in addition to location for a plurality of said marked reference points.

27. The method of claim 26 wherein the laser beam comprises visible light.

28. The method of claim 27 wherein the step of designating said first line and said second line reference points comprises a worker sensing the visible light with the worker's eyes.

* * * * *

UNITED STATES PATENT AND TRADEMARK OFFICE
CERTIFICATE OF CORRECTION

PATENT NO.        : 7,979,993 B2
APPLICATION NO.   : 12/834285
DATED             : July 19, 2011
INVENTOR(S)       : Tippett et al.

It is certified that error appears in the above-identified patent and that said Letters Patent is hereby corrected as shown below:

Col. 19, Claim 1, Line 39:
DELETE after a "valve"
ADD after a --value--

Col. 20, Claim 23, Line 44:
DELETE after a "valve"
ADD after a --value--

Col. 21, Claim 26, Line 7:
DELETE after a "valve"
ADD after a --value--

Signed and Sealed this
Second Day of October, 2012

David J. Kappos
*Director of the United States Patent and Trademark Office*